United States Patent [19]

Saito

[11] Patent Number: 5,634,027

[45] Date of Patent: May 27, 1997

[54] CACHE MEMORY SYSTEM FOR MULTIPLE PROCESSORS WITH COLLECTIVELY ARRANGED CACHE TAG MEMORIES

[75] Inventor: Mitsuo Saito, Kanagawa-ken, Japan

[73] Assignee: Kabushiki Kaisha Toshiba, Kawasaki, Japan

[21] Appl. No.: 979,806

[22] Filed: Nov. 20, 1992

[30] Foreign Application Priority Data

Nov. 20, 1991 [JP] Japan .................................. 3-304317
Nov. 20, 1991 [JP] Japan .................................. 3-304318
Nov. 20, 1991 [JP] Japan .................................. 3-304319

[51] Int. Cl.$^6$ .................................................. G06F 12/02
[52] U.S. Cl. .......................... 395/403; 395/447; 395/401
[58] Field of Search ................................ 395/425, 403, 395/401, 447

[56] References Cited

U.S. PATENT DOCUMENTS 4,953,073  8/1990  Moussouris et al. .............. 395/400
5,249,283  9/1993  Boland ............................. 395/425

*Primary Examiner*—David K. Moore
*Attorney, Agent, or Firm*—Oblon, Spivak, McClelland, Maier & Neustadt, P.C.

[57] ABSTRACT

A cache memory system capable of realizing a high level performance and a high speed processing with a simple control. The system may use a plurality of processing units and a plurality of corresponding cache memory units, where all the cache tag memory units of the cache memory units are collectively arranged in relation to the primary processing unit which carries out a memory access address calculation. The system may also use a refilling control such that a new refilling operation for a newly occurred cache miss in the primary cache memory unit is started in parallel to another refilling operation for a previously occurred cache miss in the primary cache memory unit before that another refilling operation is completed. The system may also use a refilling control such that the refilling operation is started by making an access to the secondary memory unit with a starting address at which the cache miss occurred in the primary cache memory unit, and continued by making subsequent accesses to the secondary memory unit with addresses obtained by adding an increment to the starting address one by one.

8 Claims, 17 Drawing Sheets

| FIG.7 | |
|---|---|
| FIG.7A | FIG.7B |

FIG.11A

CPU
OPERATION → 
INTERRUPTED ld  r1 , (A)
   ldi  r2 , 100
   add r3 , r2 , r1

FIG.11B ld  r1 , (A)
ldi  r2 , 100
etc
etc
etc
etc
etc
add r3 , r2 , r1

FIG.13A
| BRANCH INSTRUCTION ADDRESS | PREDICTED BRANCH TARGET ADDRESS |
|---|---|
| 101 | 201 |
| 202 | 251 |
| ⋮ | ⋮ |
FIG.13B
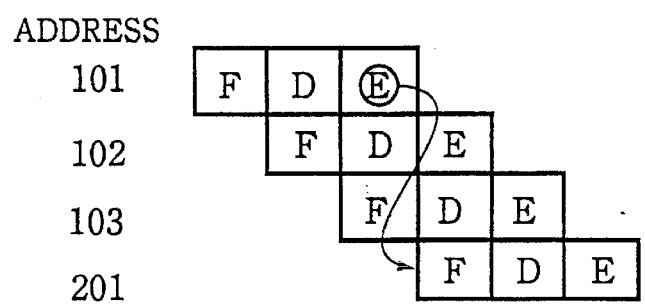
FIG.13C
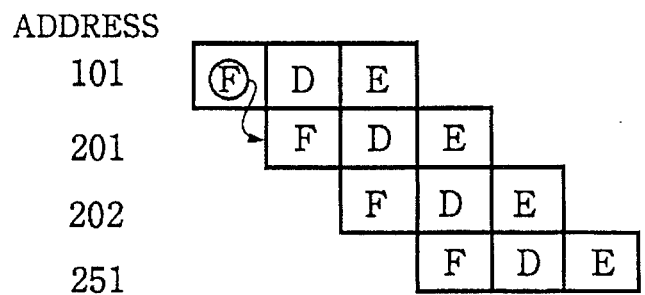
FIG.15
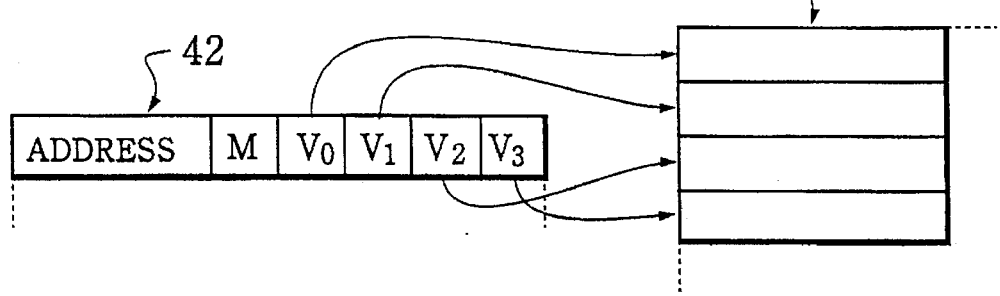

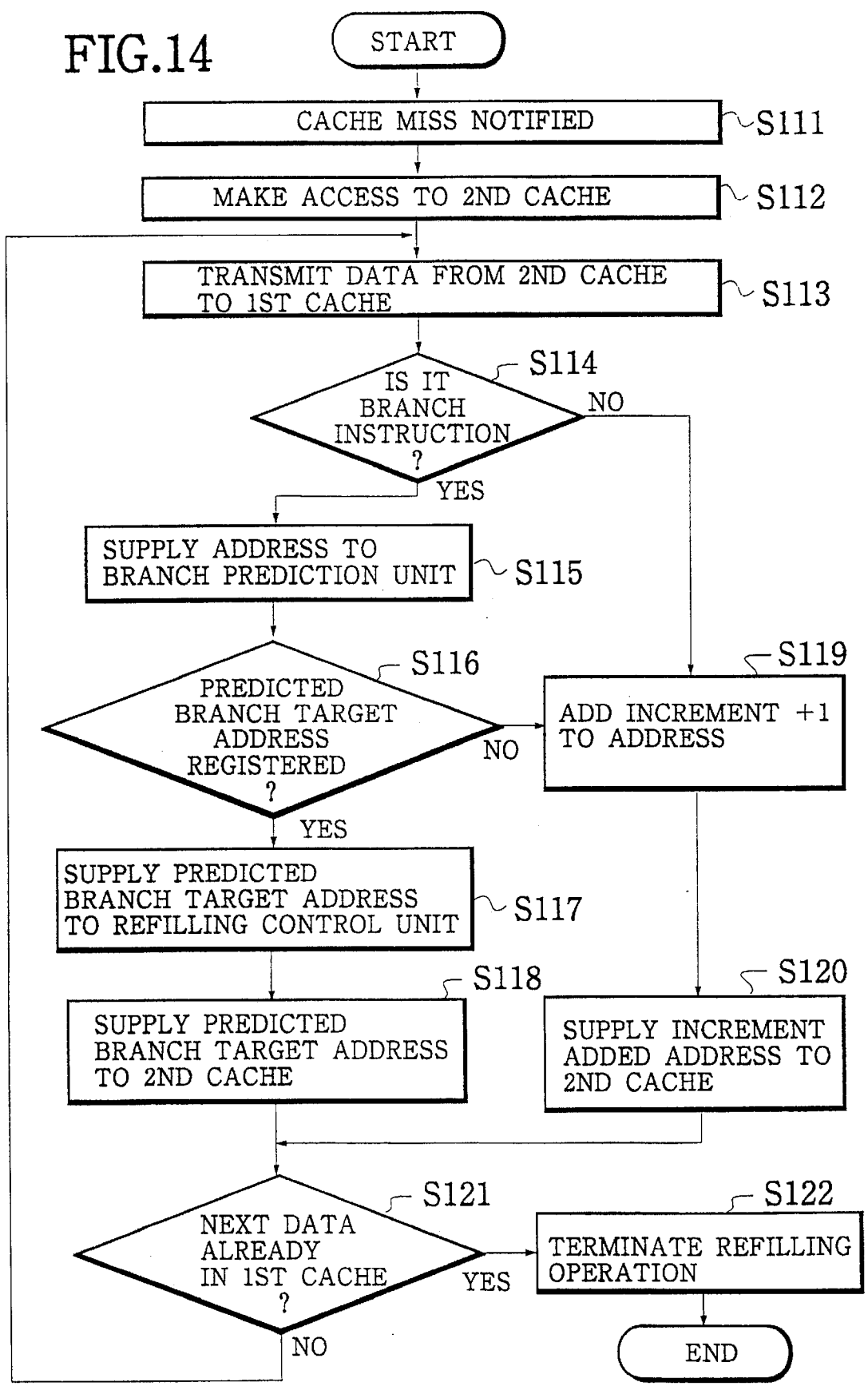

CACHE MEMORY SYSTEM FOR MULTIPLE PROCESSORS WITH COLLECTIVELY ARRANGED CACHE TAG MEMORIES

BACKGROUND OF THE INVENTION

1. Field of the Invention

The present invention relates to a cache memory system for improving a processing speed in a computer processing system.

2. Description of the Background Art

A conventional cache memory system typically has a configuration shown in FIG. 1, which has only one cache memory unit including a cache tag memory unit 125 and a cache data memory unit 126 with respect to a plurality (two in this case) of processing units including an integer unit (IU) 121 having an associated register 123 and a floating point unit (FPU) 122 having an associated register 124. This configuration of FIG. 1 is implemented on a single chip 127, so that it is quite simple and efficient for ordinary processing operations. However, when the processing units are capable of executing a plurality of memory access instructions simultaneously, the cache memory unit must have a plurality of cache memory ports, and this in turn increases an area of the cache memory unit considerably.

On the other hand, in a case of using multiple processing units in which the cache memory unit cannot be accommodated on a single chip as shown in FIG. 2, it is necessary to realize the cache memory unit in a form of a cache tag memory unit 130 and a cache data memory unit 131 which are separately implemented on different chips (chip 3 and chip 4) provided along chip 1 and chip 2 on which an integer unit (IU) 128 and a floating point unit (FPU) 129 are separately implemented. However, such a manner of implementation of multiple processing units in turn gives rise to a problem of a lowering of a processing speed in the processing units.

This problem concerning the lowering of the processing speed itself can be resolved by using a configuration as shown in FIG. 3, where an integer unit 141 has its own cache memory unit comprising an IU cache tag memory unit 143 and an IU cache data memory unit 144 which are implemented on an IU chip 148 together with the IU 141, and a floating point unit 142 has its own cache memory unit comprising a FPU cache tag memory unit 145 and a FPU cache data memory unit 146 which are implemented on an FLU chip 149 together with the FLU 142, while a main memory 147 is commonly provided with respect to the IU chip 148 and the FPU chip 149. However, in such a configuration, it is quite complicated to maintain the consistency between two cache memory units. In addition, in such a configuration, it becomes necessary to hand over the full address of the memory access instruction between these two cache memory units, and this in turn requires a large number of connection wirings between the IU chip 148 and the FPU chip 149.

Thus, a conventional single chip cache memory system has been associated with a problem of an increase of the cache memory ports to be provided on the cache memory system, especially when the cache memory unit is associated with a relatively large scale processing system capable of simultaneous execution of a plurality of instructions such as a super scalar system, whereas a conventional multi-chip cache memory system has been associated with either a problem of a lowering of a processing speed or a problem of complicated consistency control and large inter-chip connections.

Now, on the other hand, in a conventional cache memory system having only one processing unit, as shown in the timing chart of FIG. 4, the operation of the processing unit (CPU) is interrupted whenever a cache miss occurs, in order to carry out a refilling operation for refilling the missing data into the cache data memory unit, and the operation of the CPU is not resumed until such a refilling operation is completed. Here, because there are many cases which subsequently require not just the missing data alone but also the other data at addresses close to the address of the missing data, the refilling operation is usually executed over a plurality of clock cycles in order to store a plurality of consecutive data including the missing data into the cache data memory unit.

A conventional cache memory system using such a refilling operation typically has a configuration shown in FIG. 5, which comprises: a CPU 151, a first cache tag memory unit 152, a first cache data memory unit 153, a refilling control unit 154, and a second cache memory unit 155. In this configuration of FIG. 5, in reading the data from the cache memory system, the CPU 151 makes accesses to the first cache tag memory unit 152 and the first cache data memory unit 153 by specifying the desired address of the data to be read out. In a case of a cache hit at the first cache tag memory unit 152 and the first cache data memory unit 153, the desired data at the specified address can be read out from the first cache data memory unit 153 to the CPU 151. On the other hand, in a case of a cache miss at the first cache tag memory unit 152 and the first cache data memory unit 153, the refilling control unit 154 makes an access to the second cache memory unit 155 in order to execute the refilling of a series of consecutive data starting from the missing data into the first cache data memory unit 153.

This procedure for the refilling operation works effectively when the cache miss rate is relatively low. Namely, the effective memory access time Ne in such a conventional cache memory system, which represents the performance of the cache memory system, can be expressed as follows.

$$Ne = (1-Km) \cdot Ca + Km \cdot Cc$$

where Km is a cache miss rate of a cache memory unit which depends on a size of the cache memory unit and other factors, Ca is a memory access time for a case of a cache hit, Cc is a time required for refilling the data into the cache memory unit. Using a number of clock cycles for expressing time, usually, Ca takes a value of about 1, Cc takes a value of about 10, and Km takes a value of about 1% to 5%, so that the resultant Ne takes a value of about 1.1 to 1.5. This value for Ne is sufficiently small compared with a value for a case of not using a cache memory system which is about 2.0 to 3.0, and this fact indicates the effectiveness of the cache memory system.

However, there are cases in which the cache miss rate becomes quite large. In such a case, the effective memory access time can be so large that the cache memory unit is not just ineffective but can be even harmful to the overall operation of the cache memory system. A number of such cases associated with excessively large effective memory access time are increasing in recent years, as there is a tendency to limit a size of the cache memory unit in order to make a micro-processor containing the cache memory unit within itself, and as there are increasing number of cases in which an amount of data to be dealt with by the cache memory unit is very large.

Thus, in a conventional cache memory system, the increase of the cache miss rate is a direct cause of the increase of the effective memory access time realizable in the cache memory system, such that the use of the cache memory system has conventionally been ineffective for a huge scale task, if not harmful, and this problem has been hampering the further improvement of a performance of a single chip micro-processor incorporating a cache memory system within itself.

Moreover, in a case of using the cache memory system for an instruction cache, even though it is possible to alleviate the increase of the cache miss rate to some extent by refilling a prescribed number of consecutive data collectively at a single refilling operation, there still remains the problem concerning the interruption of the operation of the processing unit during the execution of the refilling operation because the operation of the processing unit cannot be continued until the next instruction is fetched, and this problem inevitably limits the level of a performance of the cache memory system.

SUMMARY OF THE INVENTION

It is therefore an object of the present invention to provide a cache memory system capable of realizing a high speed processing with a simple control, even for a relatively large scale processing system capable of simultaneous execution of a plurality of instructions and for a processing system incorporating a plurality of processing units.

It is another object of the present invention to provide a cache memory system capable of reducing a number of cache memory ports required in a single chip cache memory system.

It is another object of the present invention to provide a cache memory system capable of reducing a number of inter-chip connections required in a multi-chip cache memory system.

It is another object of the present invention to provide a cache memory system in which there is no need to interrupt the operation of a processing unit during the execution of the refilling operation, such that a high level performance can be realized in the cache memory system even when the cache miss rate is relatively high.

It is another object of the present invention to provide a cache memory system capable of continuing the operation of a processing unit during the execution of the refilling operation, even in a case of an instruction cache.

It is another object of the present invention to provide a cache memory system capable of effectively dealing with a huge scale task.

According to one aspect of the present invention there is provided a cache memory system, comprising: a plurality of processing units including a primary processing unit for carrying out a calculation of memory access addresses; and a plurality of cache memory units provided in correspondence to said plurality of processing units, each one of said plurality of cache memory units including a cache tag memory unit for determining a cache hit/miss in said each one of said plurality of cache memory units and a cache data memory unit for storing data for a respective one of said plurality of processing units, where the cache data memory unit of each one of said plurality of cache memory units is arranged in relation to the respective one of said plurality of processing units while all of the cache tag memory units of said plurality of cache memory units are collectively arranged in relation to the primary processing unit.

According to another aspect of the present invention there is provided a cache memory system, comprising: a processing unit; a primary cache memory unit for storing data to be accessed by the processing unit; a secondary memory unit for storing data to refill the primary cache memory unit in a case of a cache miss in the primary cache memory unit; and refilling control means for controlling a refilling operation from the secondary memory unit to the primary cache memory unit such that a new refilling operation for a newly occurred cache miss in the primary cache memory unit is started in parallel to another refilling operation for a previously occurred cache miss in the primary cache memory unit before said another refilling operation is completed.

According to another aspect of the present invention there is provided a method of operating a cache memory system, comprising the step of: making an access from a processing unit to a primary cache memory unit for storing data to be accessed by the processing unit; making an access from a refilling control means to a secondary memory unit for storing data to refill the primary cache memory unit in a case of a cache miss in the primary cache memory unit; and controlling a refilling operation from the secondary memory unit to the primary cache memory unit by the refilling control means such that a new refilling operation for a newly occurred cache miss in the primary cache memory unit is started in parallel to another refilling operation for a previously occurred cache miss in the primary cache memory unit before said another refilling operation is completed.

According to another aspect of the present invention there is provided a cache memory system, comprising: a processing unit; a primary cache memory unit for storing data to be accessed by the processing unit; a secondary memory unit for storing data to refill the primary cache memory unit in a case of a cache miss in the primary cache memory unit; and refilling control means for controlling a refilling operation from the secondary memory unit to the primary cache memory unit such that the refilling operation is started by making an access to the secondary memory unit with a starting address at which the cache miss occurred in the primary cache memory unit, and continued by making subsequent accesses to the secondary memory unit with addresses obtained by adding an increment to the starting address one by one.

According to another aspect of the present invention there is provided a method of operating a cache memory system, comprising the steps of: making an access from a processing unit to a primary cache memory unit for storing data to be accessed by the processing unit; making an access from a refilling control means to a secondary memory unit for storing data to refill the primary cache memory unit in a case of a cache miss in the primary cache memory unit; and controlling a refilling operation from the secondary memory unit to the primary cache memory unit by the refilling control means such that the refilling operation is started by making an access to the secondary memory unit with a starting address at which the cache miss occurred in the primary cache memory unit, and continued by making subsequent accesses to the secondary memory unit with addresses obtained by adding an increment to the starting address one by one.

Other features and advantages of the present invention will become apparent from the following description taken in conjunction with the accompanying drawings.

BRIEF DESCRIPTION OF THE DRAWINGS

FIG. 11A is an example of instruction sequence to be executed in the second embodiment of a cache memory system shown in FIG. 9, without an optimization.

FIG. 11B is an example of instruction sequence to be executed in the second embodiment of a cache memory system shown in FIG. 9, with an optimization.

FIG. 13A is a schematic diagram representing a branch prediction table in a branch prediction unit to be used in the third embodiment of a cache memory system shown in FIG. 12.

FIG. 13B is an exemplary timing chart for execution of instruction sequence in a case involving a branch instruction, without using a branch prediction unit.

FIG. 13C is an exemplary timing chart for execution of instruction sequence in a case involving a branch instruction, using a branch prediction unit.

FIG. 14 is a flow chart for a refilling operation by a refilling control unit in the third embodiment of a cache memory system shown in FIG. 12.

FIG. 15 is a schematic diagram representing an exemplary configuration of an entry in a first cache tag memory unit in the third embodiment of a cache memory system shown in FIG. 12.

DETAILED DESCRIPTION OF THE PREFERRED EMBODIMENTS

Figure 6:
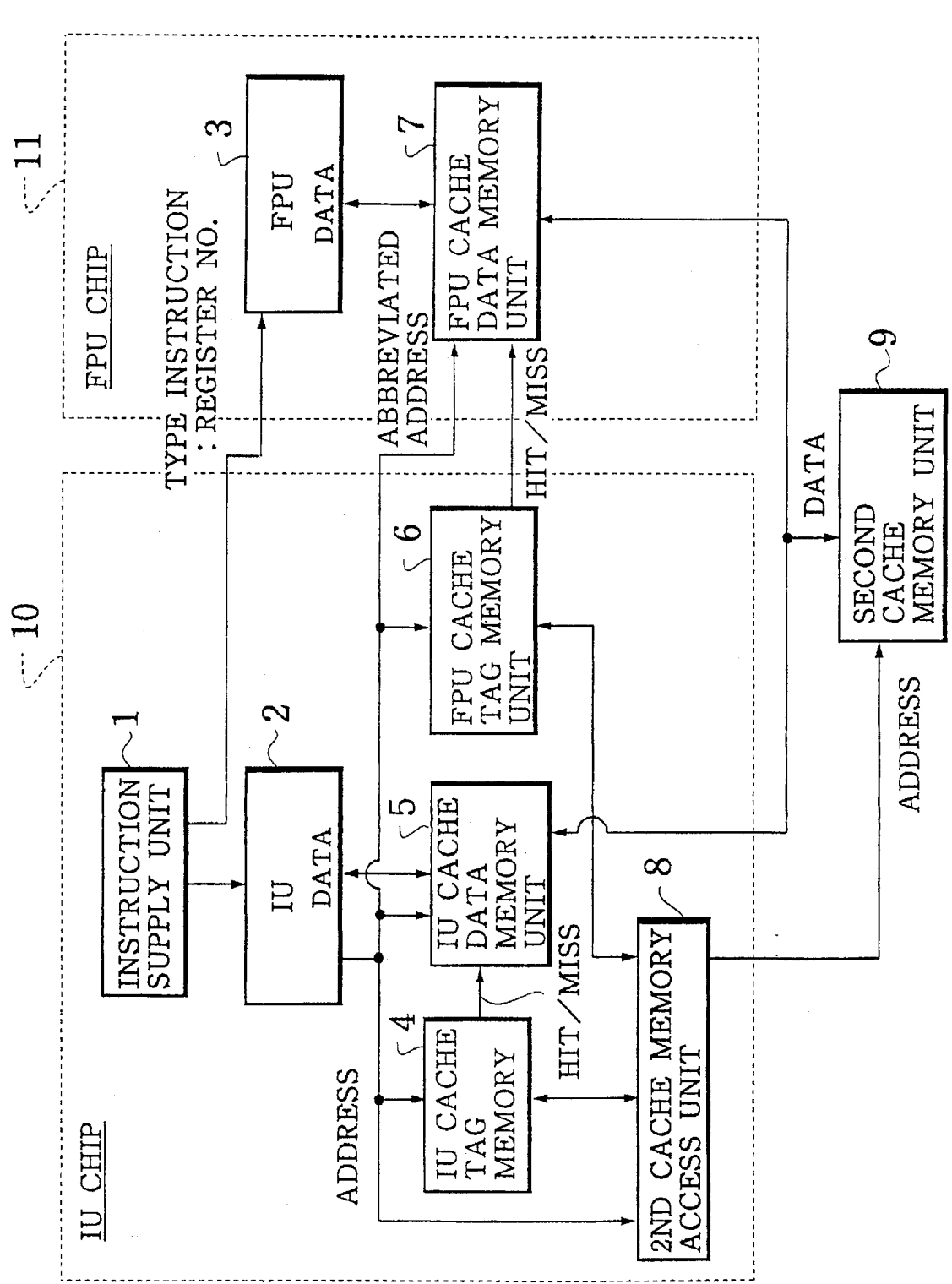
FIG. 6 is a schematic block diagram of a configuration of a first embodiment of a cache memory system according to the present invention.

Referring now to FIG. 6, a first embodiment of a cache memory system according to the present invention will be described in detail.

In this first embodiment, the cache memory system generally comprises an integer unit (IU) chip 10 having an integer unit (IU) 2 as a processing unit, a floating point unit (FPU) chip 11 having a floating point unit (FPU) 3 as a processing unit, and a second cache memory unit 9 connected with both the IU chip 10 and the FPU chip 11, which is to be used in the refilling operation of an IU cache memory unit associated with the IU 2 and an FPU cache memory unit associated with the FPU 3. The IU chip 10 further includes an instruction supply unit 1 for supplying cache read/write instructions used in this cache memory system, and the IU cache memory unit formed by an IU cache tag memory unit 4 and an IU cache data memory unit 5, an FPU cache tag memory unit 6 which forms a part of the FPU cache memory unit, and a second cache memory access unit 8 for making an access to the second cache memory unit 9 with an appropriate second cache memory access address in a case of a cache miss in the IU cache memory unit or the FPU cache memory unit, while the FPU chip 11 further includes an FPU cache data memory unit 7 which forms the FPU cache memory unit along with the FPU cache tag memory unit 6 on the IU chip 10.

Figure 7A:
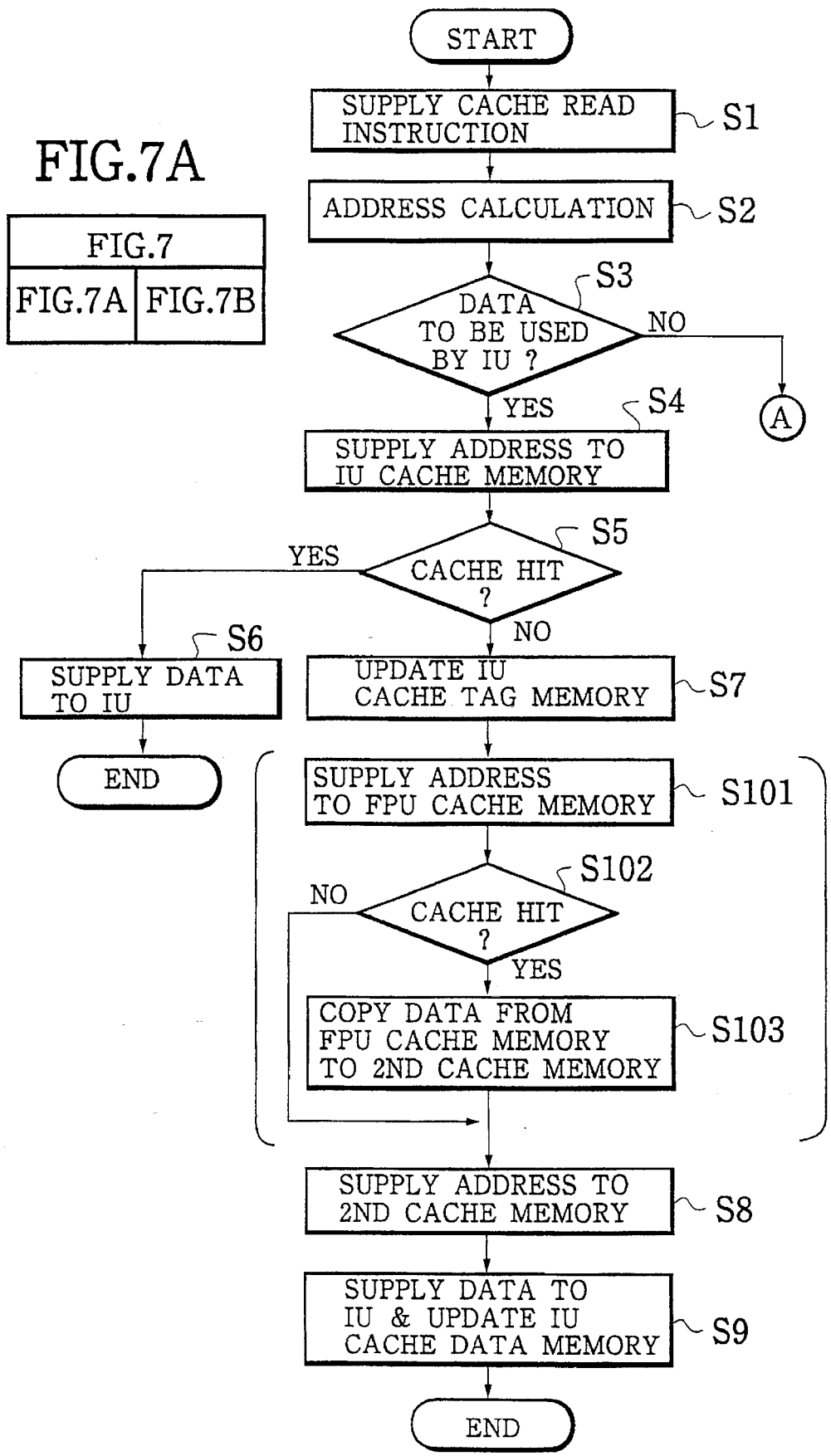
FIG. 7 consisting of FIGS. 7A and 7B is a flow chart for a cache reading operation in the first embodiment of a cache memory system shown in FIG. 6.
Figure 7B:
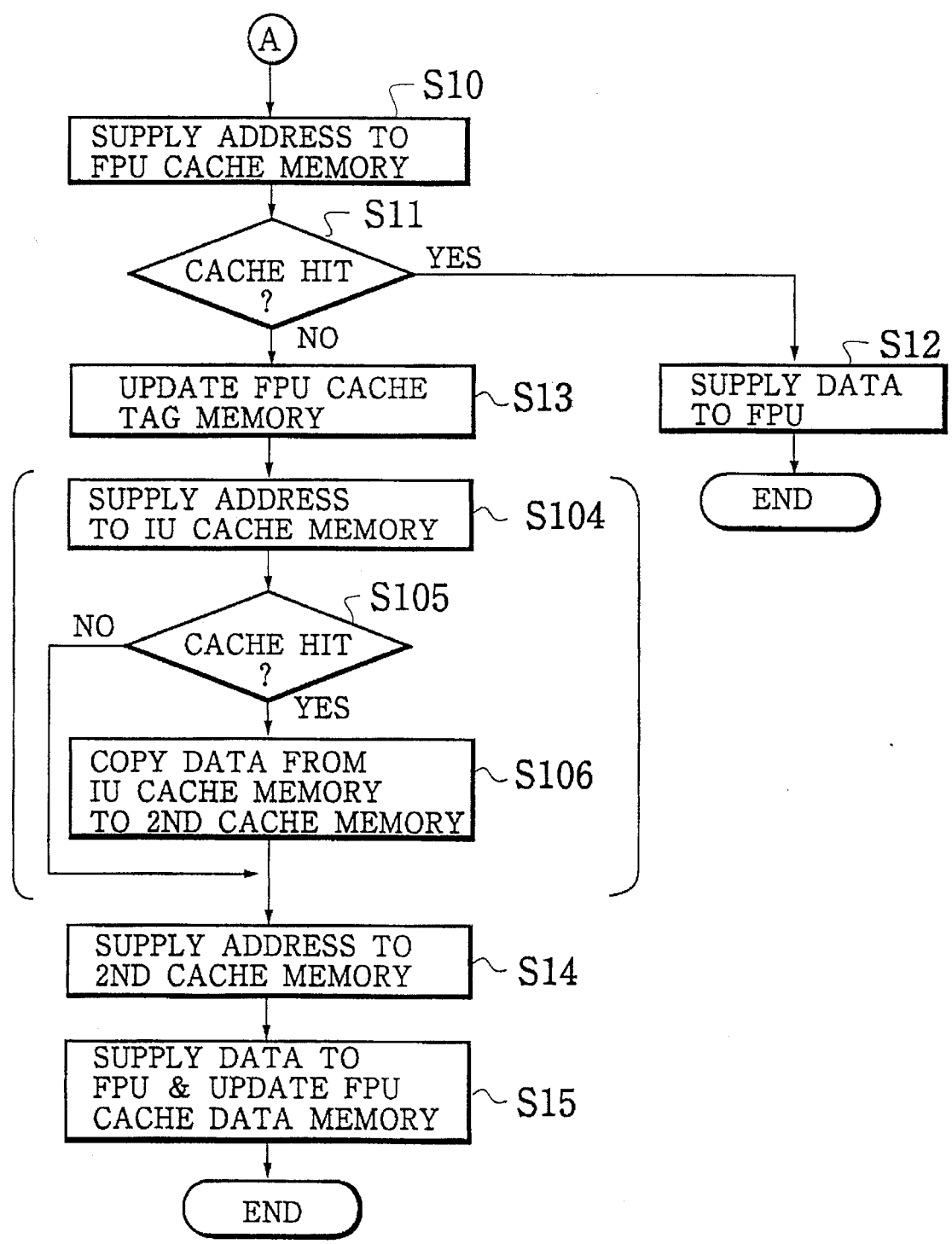

In a case of reading data from either the IU cache memory unit or the FPU cache memory unit, this cache memory system operates according to the flow chart shown in FIG. 7, as follows.

First, at the step S1, the cache read instruction for reading the desired data is supplied from the instruction supply unit 1 to the IU 2 and the FPU 3.

Then, at a processing unit of the IU 2, the address of the desired data to be read out is calculated at the step S2, and whether this cache read instruction is for the data to be used by the IU 2 or by the FPU 3 is determined at the step S3, according to the cache read instruction supplied from the instruction supply unit 1.

In a case this cache read instruction is for the data to be used by the IU 2, next at the step S4, the calculated address is supplied to the IU cache tag memory unit 4 and the second cache memory access unit 8 while an abbreviated form of the calculated address is supplied to the IU cache data memory unit 5, whereas otherwise next at the step the calculated address is supplied to the FPU cache tag memory unit 6 and the second cache memory access unit 8 while an abbreviated form of the calculated address is supplied from the IU chip 10 to the FPU cache data memory unit 7 on the FPU chip 11.

Namely, in this embodiment, a full address of each data is expressed by two digits such as "20", "31", "42", etc, and each of the IU cache data memory unit 5 and the FPU cache data memory unit 7 has ten entries with abbreviated addresses "0" to "9" such that the entry "0" stores one of the data with a full address having "0" as the second digit such as "10", "20", "30", etc., the entry "1" stores one of the data with a full address having as the second digit such as "11", "12", "13", etc., and so on. Therefore, the full address such as "31" should be given to the IU cache tag memory unit 4 and the FPU cache tag memory 6, while only the abbreviated address such as "1" should be given to the IU cache data memory unit 5 and the FPU cache data memory unit 7.

Figure 1:
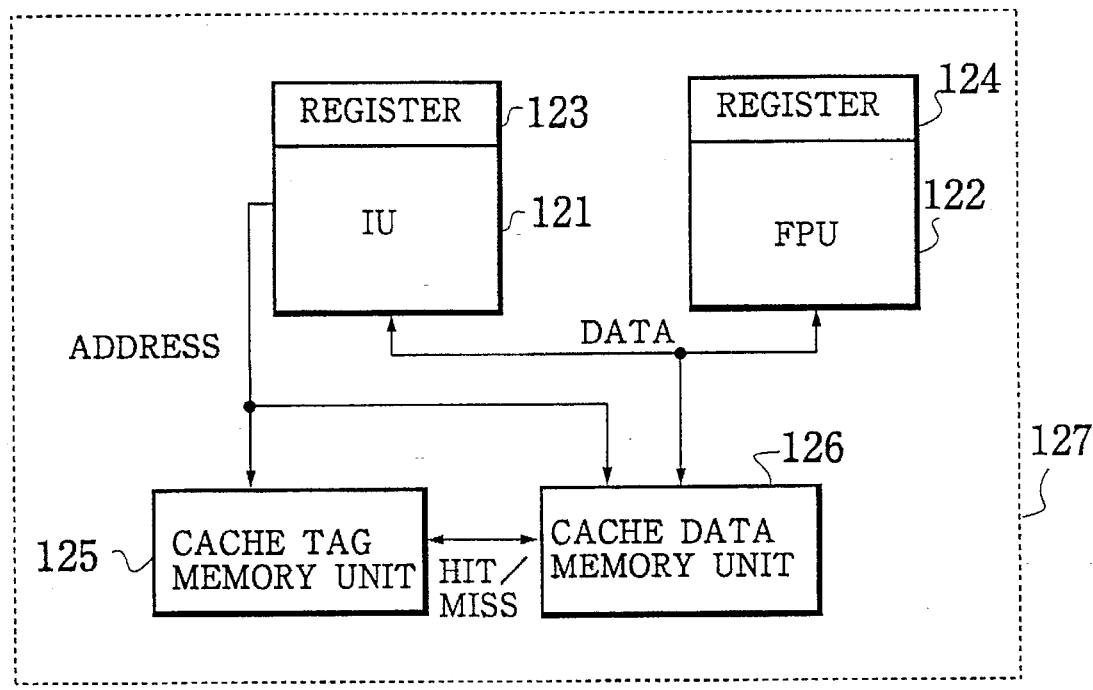
FIG. 1 is a schematic block diagram of an exemplary configuration of a conventional single chip cache memory system.
Figure 2:
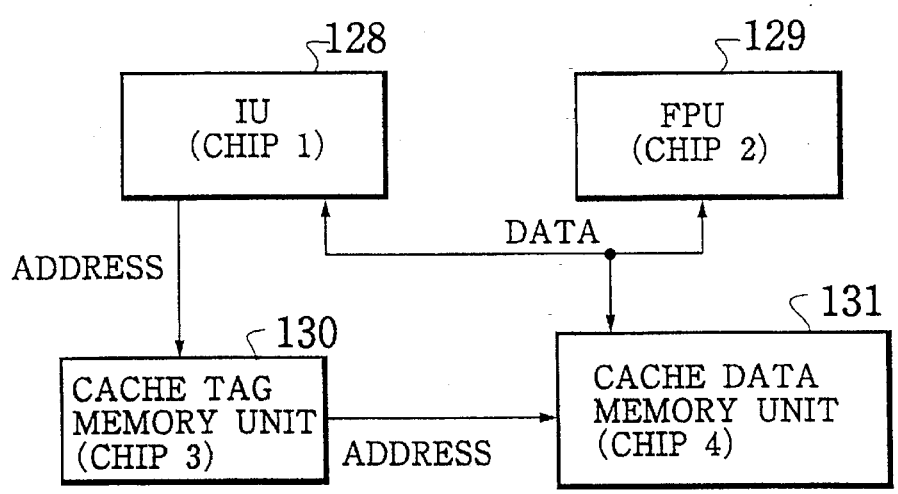
FIG. 2 is a schematic block diagram of an exemplary configuration of a conventional multi-chip cache memory system.
Figure 3:
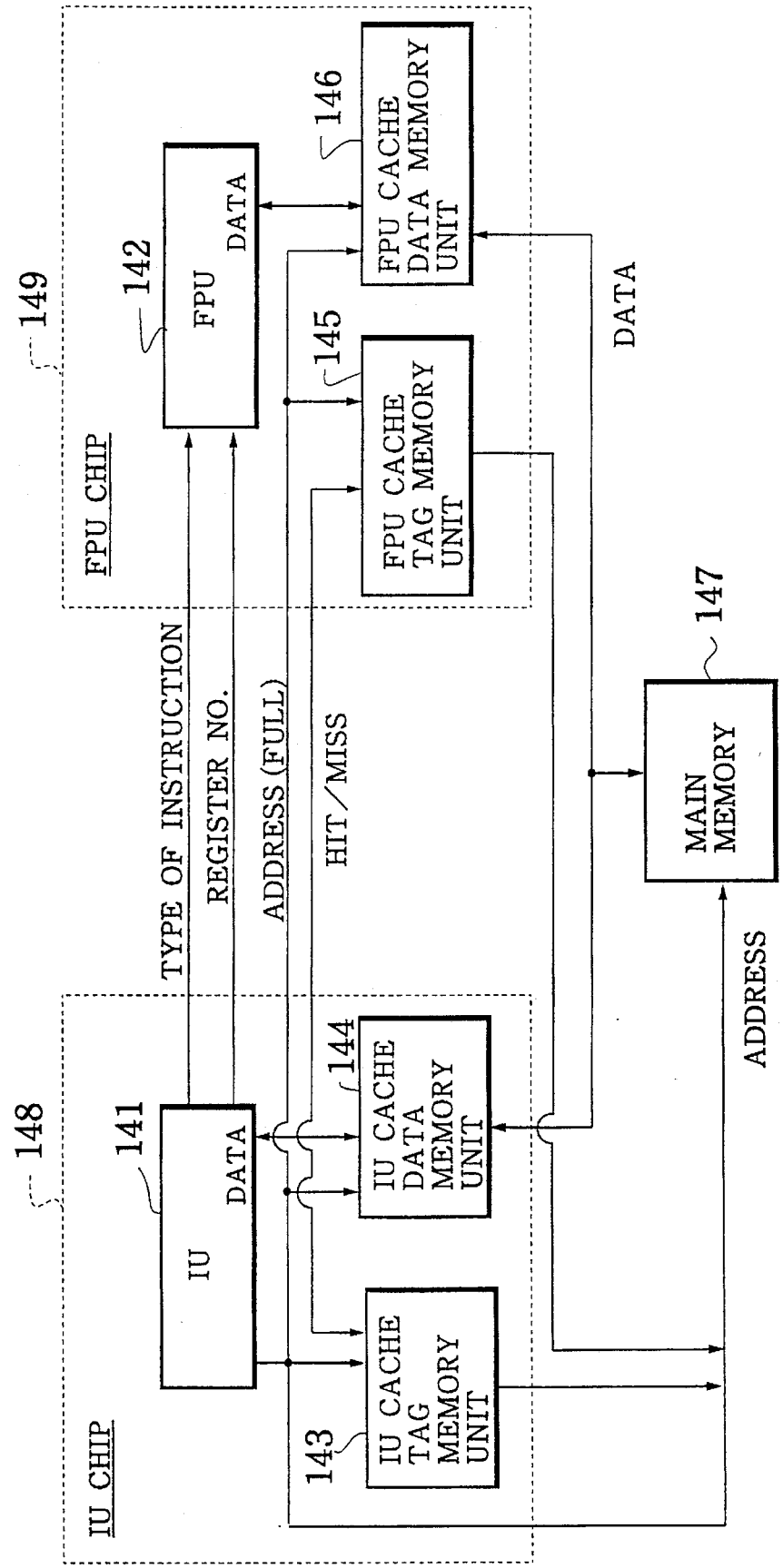
FIG. 3 is a schematic block diagram of an exemplary configuration of a conventional cache memory system having separate cache memory units for different processing units.
Figure 4:
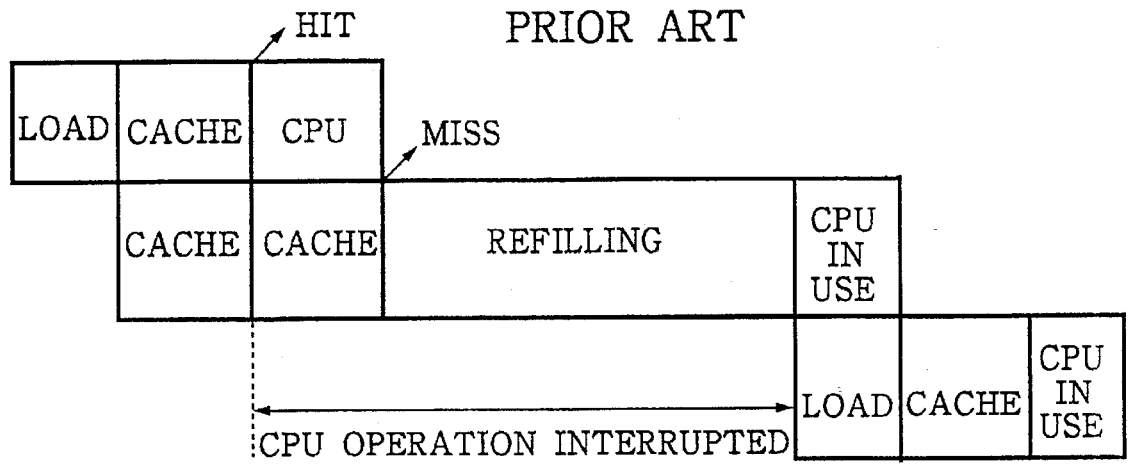
FIG. 4 is a timing chart for an exemplary operation in a conventional cache memory system when a cache miss occurs.
Figure 5:
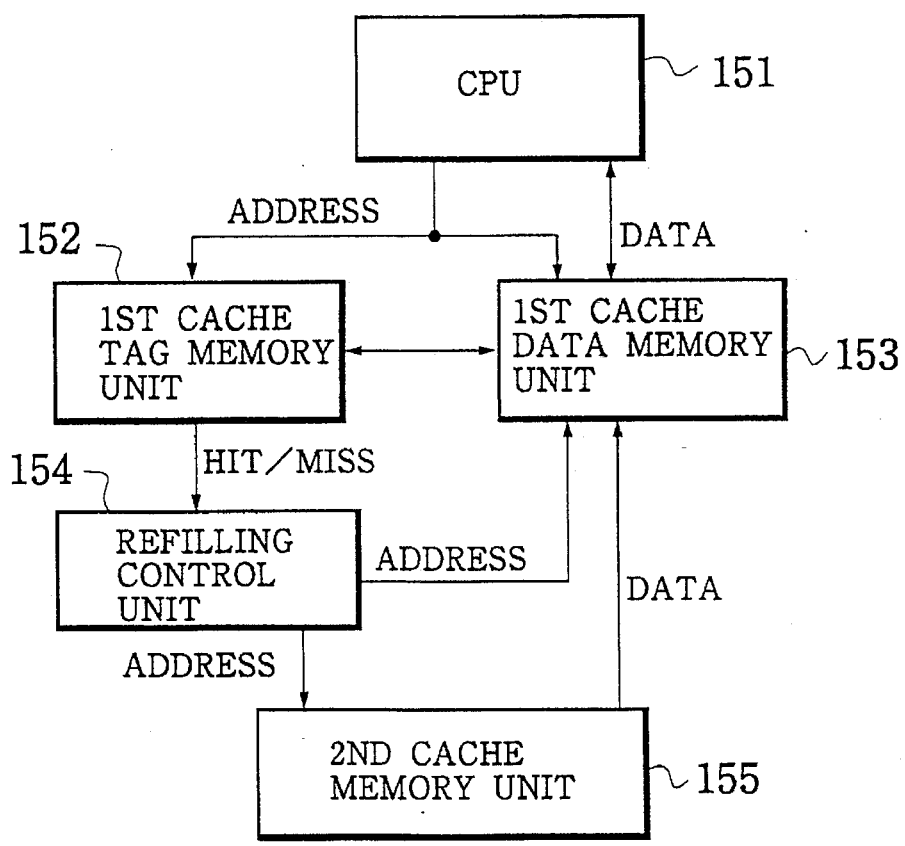
FIG. 5 is a schematic block diagram of an exemplary configuration of a conventional cache memory system incorporating a refilling function using a second cache memory unit.

Now, in this embodiment, the FPU cache tag memory 6 is provided on the IU chip 10 along with the IU cache tag memory unit 4 and the IU cache data memory 5, and only the FPU cache tag memory unit 7 is provided on the FPU chip 11, so that only the abbreviated address to be supplied to the FPU cache data memory unit 7 needs to be transferred from the IU chip 10 to the FPU chip 11. Consequently, a number of inter-chip connection wirings required between the IU chip 10 and the FPU chip 11 in this embodiment can be smaller than a conventional cache memory system having separate cache memory units on different chips such as that shown in FIG. 3 described above.

In a case of this embodiment, the access to the FPU 8 is to be made in units of 32 bits per word, so that when the FPU cache data memory unit 7 has a memory capacity of 16 KB, the FPU cache data memory unit 7 can store as many as 4000 words, and consequently a necessary number of inter-chip connection wirings can be only as small as 12 because $2^{12}=4096$ different types of address that can be specified by these 12 inter-chip connection wirings are sufficient to specify 4000 different addresses in the FPU cache data memory unit 7.

After the step S4, next at the step S5, whether it is a cache hit for the address supplied to the IU cache memory unit at the step S4 is determined.

In a case of the cache hit, the data stored in the IU cache data memory unit 5 is supplied to the IU 2 at the step S6 and the process terminates.

On the other hand, in a case of the cache miss, the second cache memory access unit 8 replaces an address at a desired entry in the IU cache tag memory unit 4 by the calculated address at the step S7, and supplies an appropriate second cache memory access address corresponding to the calculated address in full address format to the second cache memory unit 9 at the step S8. Then, at the step S9, the desired data at the appropriate second cache memory access address in the second cache memory unit 9 is supplied from the second cache memory unit 9 to the IU 2 through the IU cache data memory unit 5, such that the IU cache memory unit can be updated to store this desired data.

Similarly, after the step S10, next at the step S11, whether it is a cache hit for the address supplied to the FPU cache memory unit at the step S10 is determined.

In a case of the cache hit, the data stored in the FPU cache data memory unit 7 is supplied to the FPU 3 at the step S12 and the process terminates.

On the other hand, in a case of the cache miss, the second cache memory access unit 8 replaces an address at a desired entry in the FPU cache tag memory unit 6 by the calculated address at the step S13, and supplies an appropriate second cache memory access address corresponding to the calculated address in full address format to the second cache memory unit 9 at the step S14. Then, at the step S15, the desired data at the appropriate second cache memory access address in the second cache memory unit 9 is supplied from the second cache memory unit 9 to the FPU 2 through the FPU cache data memory unit 7, such that the FPU cache memory unit can be updated to store this desired data.

Thus, in this embodiment, only the step S12 takes place within the FPU chip 11 side, and apart from the steps S9 or S15 involving the second cache memory unit 9 which takes place in a case of the cache miss, all the rest of the steps in this data reading process take place within the IU chip 10 side.

In the data reading process described above, a case of cache read instruction for the data in the FPU cache memory unit which is to be used by the IU 2 or the data in the IU cache memory unit which is to be used by the FPU 3 can be handled as follows.

In such a case, when this cache memory system adopts the so called write through cache scheme in which the second cache memory unit 9 is always updated, the required data can be read from the second cache memory unit 9 just as in the case of the cache miss described above.

On the other hand, when this cache memory system adopts the so called copy back cache scheme in which the second cache memory unit 9 is updated only when the second cache memory unit 9 is accessed, the additional steps S101 to S103 must be carried out between the steps S7 and S8 and the additional steps S104 to S106 must be carried out between the steps S13 and S14.

Namely, after the step S7, the address of the required data is supplied to the FPU cache tag memory unit 6 at the step S101, and whether it is a cache hit or a cache miss in the FPU cache memory unit is determined at the step S102. In a case of a cache hit, the copy back of the required data stored in the FPU cache data memory unit 7 to the second cache memory unit 9 is carried out at the step S103 and then the process proceeds to the step S8, whereas in a case of a cache miss the process directly proceeds from the step S102 to the step S8.

Similarly, after the step S13, the address of the required data is supplied to the IU cache tag memory unit 4 at the step S104, and whether it is a cache hit or a cache miss in the IU cache memory unit is determined at the step S105. In a case of a cache hit, the copy back of the required data stored in the IU cache data memory unit 5 to the second cache memory unit 9 is carried out at the step S106 and then the process proceeds to the step S14, whereas in a case of a cache miss the process directly proceeds from the step S102 to the step S14.

In such a case, the operation is effectively the same as a case of a cache miss, so that the operation can be considered as less efficient compared with a case of using only one cache memory. However, it is to be noted that such a case is actually very rarely encountered because it is very rare for the IU 2 and the FPU 8 to commonly use the same data.

Here, it is to be noted that, in a case of the copy back cache scheme described above, the data reading process can be carried out more efficiently by omitting the step S3 and unifying the sequence subsequent to the step S4 and the sequence subsequent to the step S10, by always supplying the calculated address to both the IU cache tag memory unit 4 and the FPU cache tag memory unit 6 regardless of whether the cache read instruction is for the data to be used by the IU 2 or by the FPU 3.

It is also to be noted that in the data reading process described above, in a case of a cache miss, the rewriting of the IU cache tag memory unit 4 or the FPU cache tag memory unit 6 to be carried out at the step S7 or the step S13 in the above description may be carried out at the step S13 or the step S15 instead.

Figure 8A:
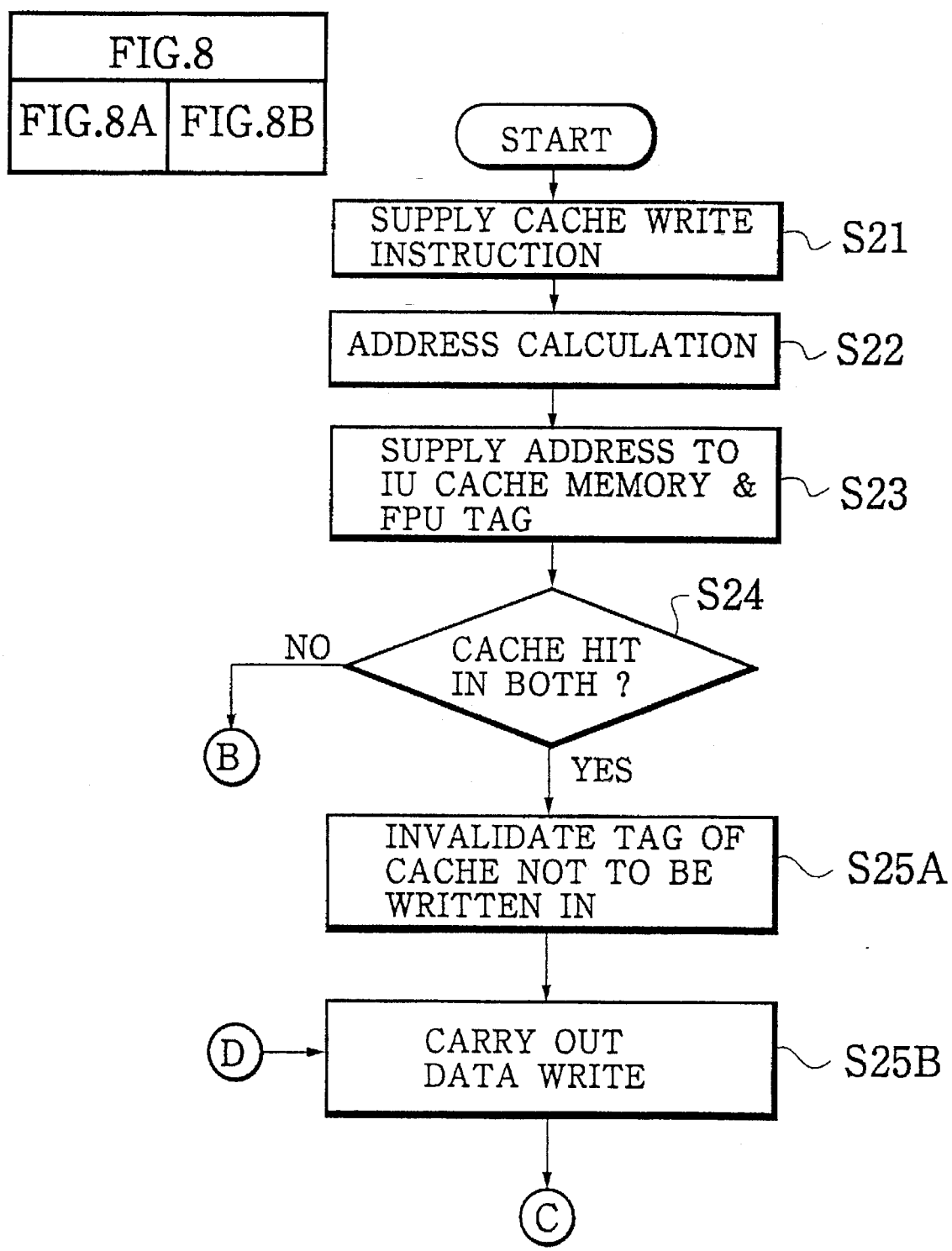
FIG. 8 consisting of FIGS. 8A and 8B is a flow chart for a cache writing operation in the first embodiment of a cache memory system shown in FIG. 6.
Figure 8B:
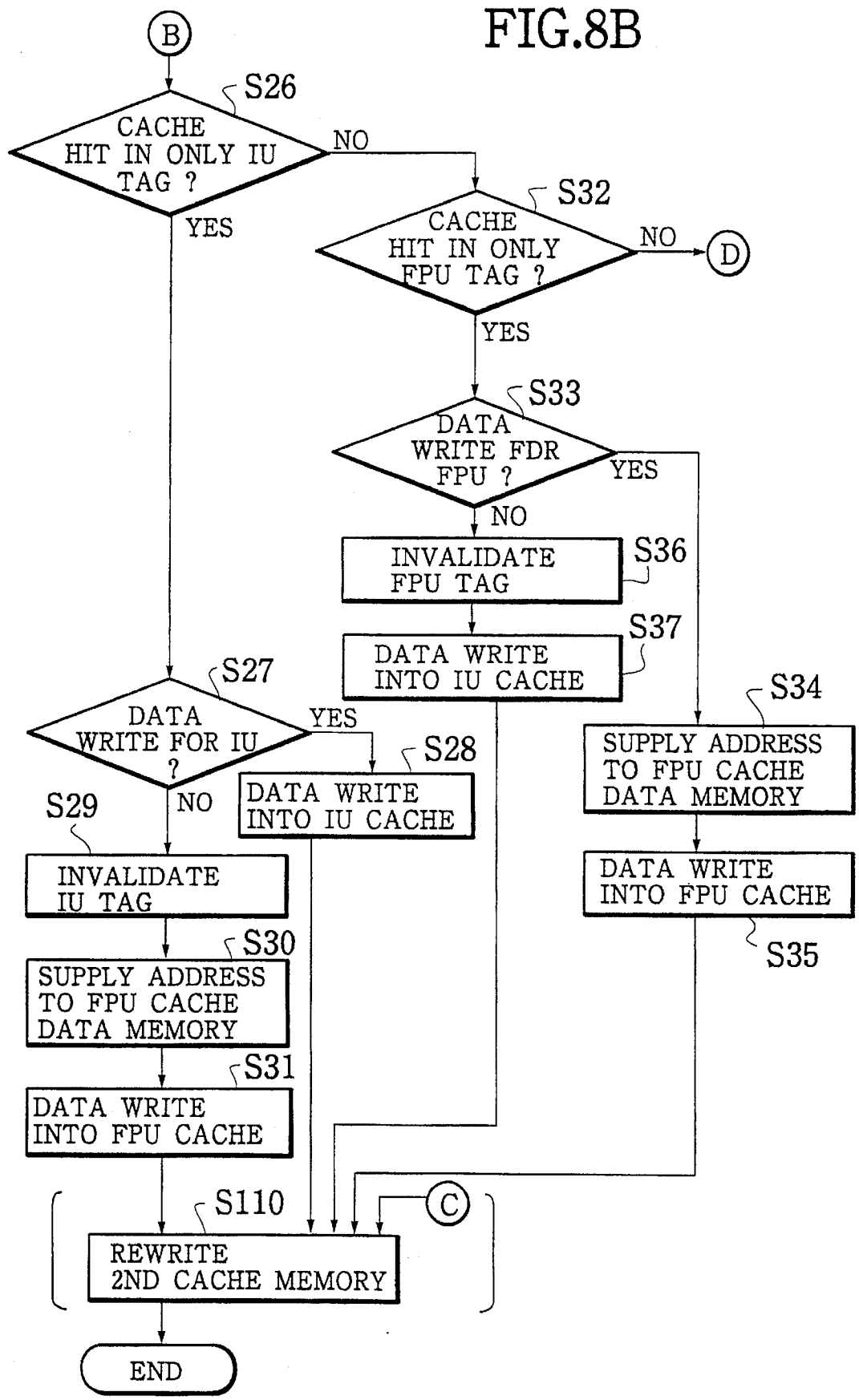

In a case of writing data into either the IU cache memory unit or the FPU cache memory unit, this cache memory system operates according to the flow chart shown in FIG. 8, as follows.

First, at the step S21, the cache write instruction for writing the desired data is supplied from the instruction supply unit 1 to the IU 2 and the FPU 3.

Then, at a processing unit of the IU 2, the address of the desired data to be written in is calculated at the step S22, and the calculated address is supplied to the IU cache tag memory unit 4, the FPU cache tag memory unit 6, and the second cache memory access unit 8, while an abbreviated part of the calculated address is supplied to the IU cache data memory unit 5.

Next, at the step S24, whether it is a cache hit in both the IU cache tag memory unit 4 and the FPU cache tag memory unit 6 or not is determined. In a case it is a cache hit in both, next at the step S25A, the calculated address in one of the IU cache tag memory unit 4 and the FPU cache tag memory unit 6 to which the writing of the data is not instructed by this data writing instruction is invalidated, and at the step S25B, the writing of the data into one of the IU cache data memory unit 5 and the FPU cache data memory unit 7 to which the writing of the data is instructed by this data writing instruction is carried out.

Otherwise, next at the step S26, whether it is a cache hit only in the IU cache memory unit or not is determined. If it is a cache hit only in the IU cache memory unit, next at the step S27, whether this data writing instruction is for the IU cache memory unit or not is determined and if this data writing instruction Is for the IU cache memory unit, next at the step S28, the writing of the data from the IU 2 into the IU cache data memory unit 5 is carried out. If this data writing instruction is not for the IU cache memory unit the calculated address in the IU cache tag memory unit 4 is invalidated at the step S29, and the calculated address in the abbreviated address format is transmitted from the IU 2 to the FPU cache data memory unit 7 at the step S30, and then the writing of the data from the FPU 3 into the FPU cache data memory unit 7 is carried out at the step S31.

In a case it is not a cache hit only in the IU cache memory unit at the step S26, next at the step S32, whether it is a cache hit only in the FPU cache memory unit or not is determined. If it is a cache hit only in the FPU cache memory unit, next at the step S33, whether this data writing instruction is for the FPU cache memory unit or not is determined and if this data writing instruction is for the FPU cache memory unit, the calculated address in the abbreviated address format is transmitted from the IU 2 to the FPU cache data memory unit 7 at the step S34, and then the writing of the data from the FPU 3 into the FPU cache data memory unit 7 is carried out at the step S35. If this data writing instruction is not for the FPU cache memory unit, the calculated address in the FPU cache tag memory unit 6 is invalidated at the step S36 and the writing of the data from the IU 2 into the IU cache data memory unit 5 is carried out at the step S37.

If it is not a cache hit only in the FPU cache memory unit at the step S32, the process proceeds to the step S25B described above such that the writing of the data into one of the IU cache data memory unit 5 and the FPU cache data memory unit 7 to which the writing of the data is instructed by this data writing instruction is carried out by overwriting the oldest cache entry. Here, in a case the oldest cache entry is to be saved, the writing operation of the data instructed by this data writing instruction may be interrupted until the oldest cache entry is copied into the second cache memory unit 9. In such a case, the interruption of the data writing operation is possible because the actual data writing operation is carried out in the last half of a clock cycle, and because the interruption of the data writing operation is completely determined within the IU chip 10 side such that there is hardly any delay due to the inter-chip signal transmission.

It is to be noted that in the data writing process described above, the tag check can also be carried out before the access to the IU cache data memory unit 5 or the FPU cache data memory unit 7 is made.

It is further to be noted that in a case this cache memory system adopts the write through cache scheme, an additional step S110 for rewriting the data in the calculated address in the second cache memory unit 9 by making an access to the second cache memory unit 9 through the second cache memory access unit 8 must be added after each one of the steps S25B, S28, S31, S35, and S37 before the data writing process terminates.

Thus, in this embodiment, only the steps S31 and S37 take place within the FPU chip 11 side, and apart from the step S110 involving the second cache memory unit 9 which takes place in a case of adopting the write through cache scheme, all the rest of the steps in this data writing process take place within the IU chip 10 side.

As described, according to this first embodiment, it becomes possible to provide a cache memory system capable of realizing a high speed processing with a simple control, even for a relatively large scale processing system capable of simultaneous execution of a plurality of instructions as well as for a processing system incorporating a plurality of processing units, because all the cache tag memories of the cache memory units involved in the cache memory system are collectively provided on one chip.

Moreover, according to this first embodiment, it also becomes possible to provide a cache memory system capable of reducing a number of inter-chip connections required in a multi-chip cache memory system, because it is necessary to transfer only an abbreviated address from one chip to another chip.

It is to be noted that the application of this first embodiment to a case of a single chip cache memory system in which the IU chip 10 and the FPU chip 11 are combined together also has a significant advantage. Namely, in order to increase a number of cache instructions which can be simultaneously executed in such a single chip cache memory system, a number of cache memory ports must be increased accordingly when the cache memory system incorporates only one cache memory, so that the actual hardware size of the cache memory inevitably increases in proportion to the number of cache memory ports, even for the same memory capacity. In contrast, by applying the configuration of this first embodiment to such a single chip cache memory system by providing separate cache memories for different processing units, it becomes possible to reduce the number of cache memory ports required in each cache memory of the single chip cache memory system.

It is also to be noted that a number of cache instructions which can be simultaneously executed in the cache memory system of the first embodiment described above can be increased by providing a plurality of processing units and a plurality of memory ports on each of the IU 2 and the FPU 3, and replacing each signal line shown in FIG. 6 by a plurality of signal lines. Here, for example, in a case of providing two processing units and two memory ports on each of the IU 2 and the FPU 3, each of the IU 2 and the FPU 3 becomes capable of making two memory accesses simultaneously, so that altogether four memory accesses can be made simultaneously in the cache memory system as a whole. In correspondence, each of the IU cache tag memory unit 4 and the FPU cache tag memory unit 6 must be equipped with four cache memory ports, but each of the IU cache data memory unit 5 and the FPU cache data memory unit 7 are required to have only two cache memory ports. Since the cache data memory is usually larger in size than the cache tag memory, this reduction of a number of cache memory ports from the cache data memory parts is quite significant in the reduction of an overall size of the cache memory system.

It is also to be noted that types of the processing units to be used in this first embodiment are not limited to the IU 2 and FPU 3 used in the description given above, and may include other types of the processing unit for a specialized calculation such as a graphic unit, a branch processing unit, etc.

It is further to be noted that in a case of using more than three processing units in the first embodiment described above, similarly to the case of using two processing units described above, all of the instruction supply unit, second cache memory access unit, and cache tag memory units of all the cache memory units involved are to be collectively provided on a chip for one of the processing unit which is preferably the IU 2, while the other chips of the other processing units are provided similarly to the FPU 11 in the description given above. Here, it is preferable to provided these elements collectively on the IU chip 10 because the address calculation is usually carried out in terms of integers.

Moreover, the second cache memory unit 9 in the description given above may be replaced by a main memory of a processing system to which this cache memory system of the first embodiment is going to be incorporated as a part.

In addition, the chips for various processing units used in the description above may be replaced by circuit boards, if desired.

Figure 9:
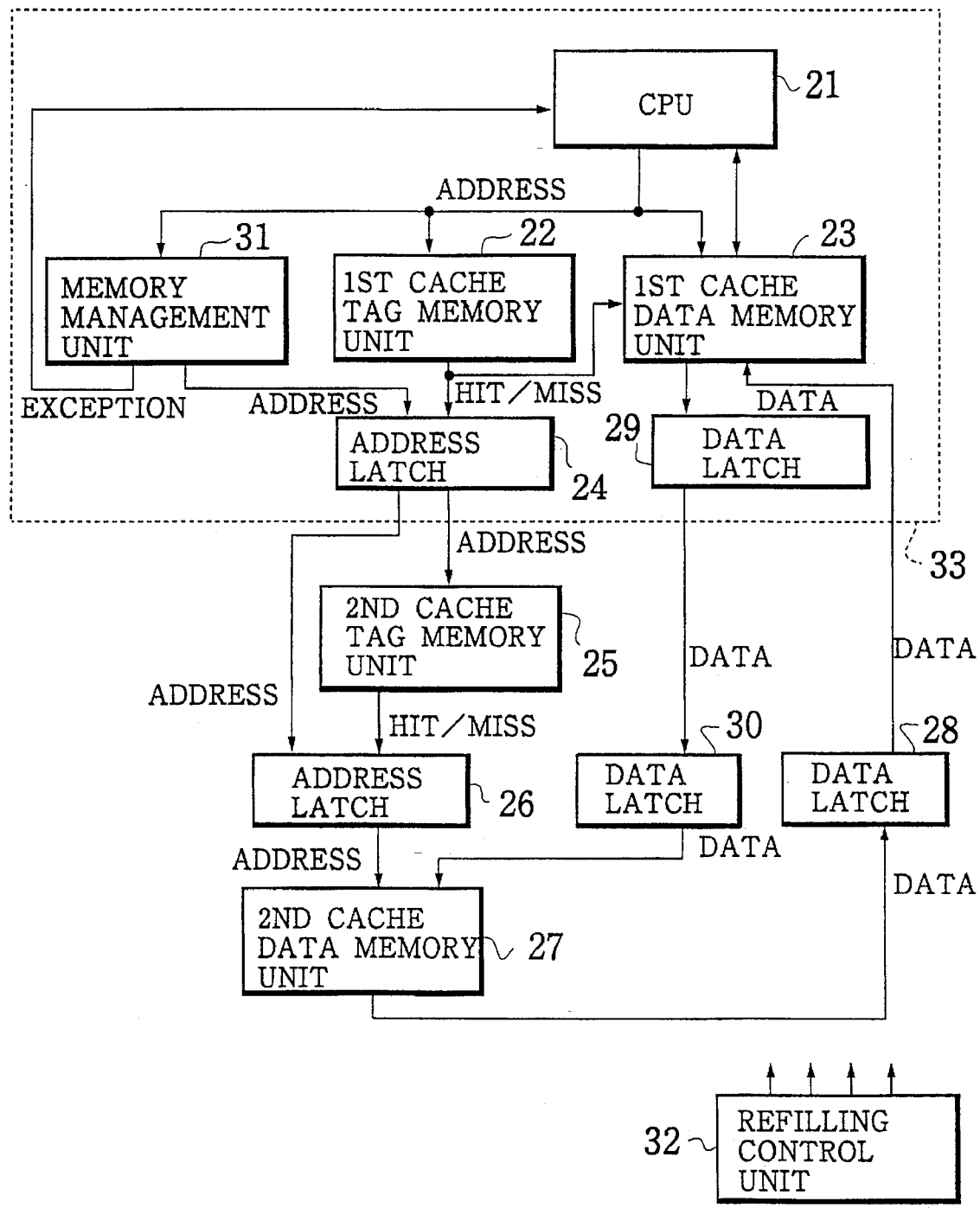
FIG. 9 is a schematic block diagram of a configuration of a second embodiment of a cache memory system according to the present invention.

Referring now to FIG. 9, a second embodiment of a cache memory system according to the present invention will be described in detail.

In this second embodiment, the cache memory system comprises: a CPU 21; a first cache memory unit formed by a first cache tag memory unit 22 and a first cache data memory unit 23; a memory management unit 31 for managing data supply to the CPU 21; an address latch 24 for latching an address supplied from the memory management unit 31 in a case of cache reading and writing operations; and a data latch 29 for latching a data supplied from the first cache data memory unit 23 in a case of a cache writing operation; all of which are collectively provided on a single chip 33.

In addition, the cache memory system of this second embodiment further comprises: a second cache memory unit formed by a second cache tag memory unit 25 and a second cache data memory unit 27; an address latch 26 connected between the second cache tag memory unit 25 and the second cache data memory unit 27, for latching an address supplied from the address latch 24; a data latch 28 for latching the data to be supplied from the second cache data memory unit 27 to the first cache data memory unit 23; a data latch 30 for latching the data to be supplied from the data latch 29 to the second cache data memory unit 27 in a case of cache writing operation; and a refilling control unit 32 for controlling the operations of the address latches 24 and 26, and the data latches 28, 29, and 30 during the refilling operation to be carried out in a case of a cache miss in the first cache memory unit.

In a case of a cache reading operation, this cache memory system operates according to the operation sequences (A), (B) and (C) in the timing chart shown in FIG. 10, as follows.

First, the CPU 21 makes an access to the first cache memory unit by supplying an address of the desired data to be read out to the first cache tag memory unit 22, the first cache data memory unit 23, and the memory management unit 31. Then, whether it is a cache hit or a cache miss is determined at the first cache tag memory unit 22.

In a case of a cache hit in the first cache memory unit, the data stored at the supplied address in the first cache data memory unit 23 is read out to the CPU 21, just as in a conventional cache memory system. In this case, the cache reading operation can be completed in one clock cycle as indicated in an operation sequence (A) of FIG. 10.

On the other hand, in a case of a case miss, the following refilling operation is carried out according to an operation sequence (B) of FIG. 10 as follows.

Namely, when the cache miss occurred at the clock cycle (2), the address of the desired data supplied from the memory management unit 31 and temporarily stored in the address latch 24 is read out from the address latch 24 to the address latch 26 at the clock cycle (3) while an access to the second cache tag memory unit 25 is made by using the address temporarily stored in the address latch 24 at the clock cycle (4). Then, the cache hit in the second cache memory unit is checked at the second cache tag memory unit 25, while the address stored in the address latch 26 is read out at the clock cycle (5). Then, an access to the second cache data memory unit 27 is made by using the address read out from the address latch 28 at the clock cycle (6), the data stored at the address of the desired data in the second cache data memory unit 27 is temporarily stored in the data latch 28 at the clock cycle (7), and the desired data is supplied to the CPU 21 through the first cache data memory unit 23 at the clock cycle (8) while updating the first cache memory unit. Thus, the operation of the CPU 21 can be resumed only from the clock cycle (8) in this operation sequence (B) of FIG. 10, i.e., the seventh clock cycles since the occurrence of the initial supply of the address of the desired data from the CPU 21.

Now, in this second embodiment, during the refilling operation as described above, the other data reading operation is carried out simultaneously, in a manner of pipeline processings, by using the address latches 24 and 26 and the data latch 28 as follows.

Figure 10:
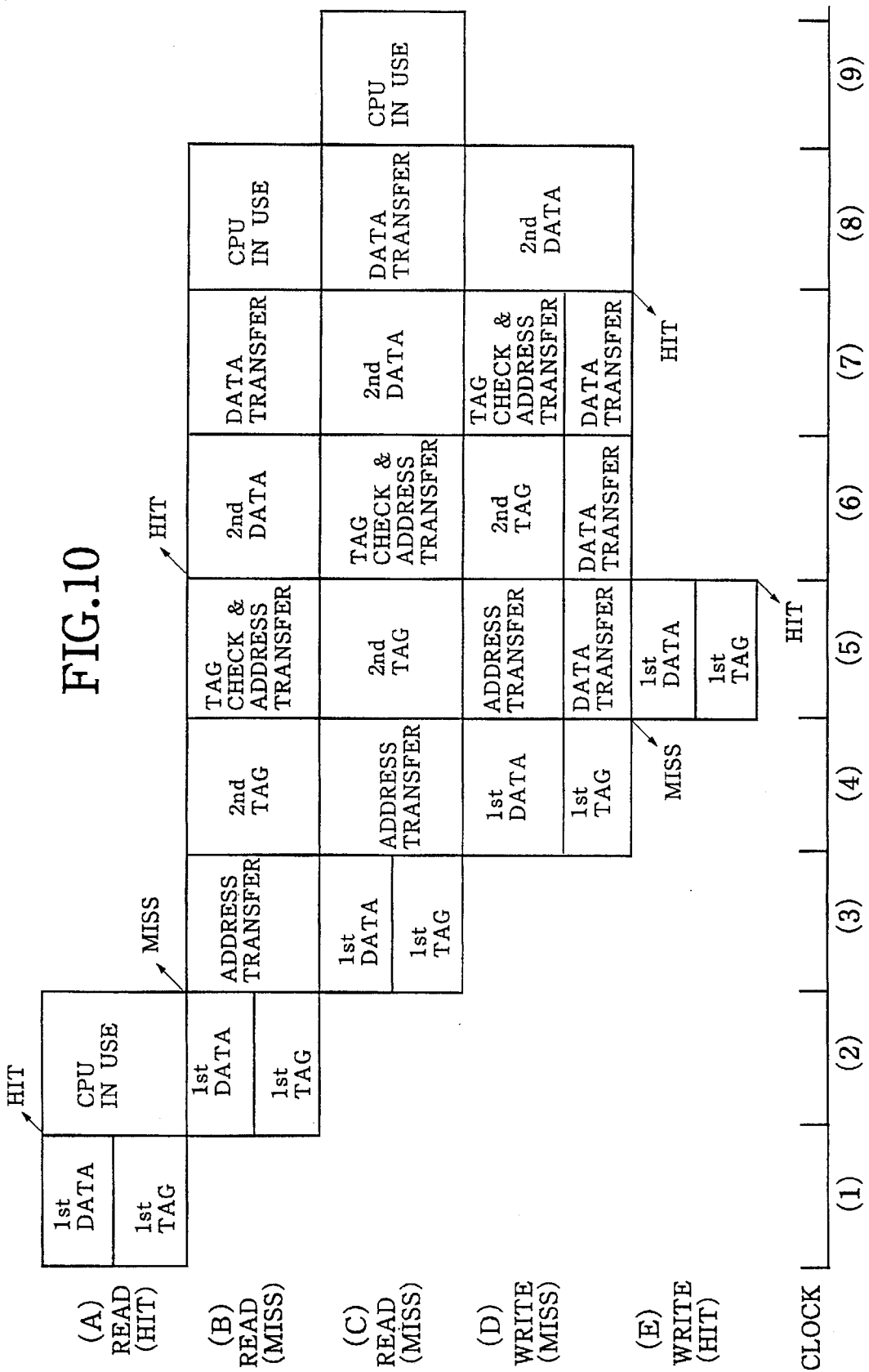
FIG. 10 is a timing chart for cache read/write and refilling operations in the second embodiment of a cache memory system shown in FIG. 9.

Namely, when the cache miss in the first cache memory unit occurred as in the clock cycle (2) in the operation sequence (B) of FIG. 10, the operation of the CPU 21 is not interrupted and continued to carry out the next data reading operation in the operation sequence (C) of FIG. 10 from the next clock cycle (3) while the refilling operation in the operation sequence (B) of FIG. 10 proceeds. This is possible in this second embodiment because the address for the operation sequence (B) in the address latch 24 is transferred to the address latch 28 at the clock cycle so that the address latch 24 is ready for the next data reading operation of the operation sequence (C) at the clock cycle (3), and the address for the operation sequence (B) in the address latch 26 and the data for the operation sequence (B) in the data latch 28 are transferred to the second cache data memory unit 27 at the clock cycle (5) and to the first cache data memory unit 23 at the clock cycle (7), respectively, so that the address latch 26 and the data latch 28 are ready for the next refilling operation even when the cache miss occurred in the immediately following operation sequence (C) at the clock cycle (3), As a consequence, in this second embodiment, the time required between the start of the data reading operation in the operation sequence (B) of FIG. 10 and the end of the data reading operation in the operation sequence (C) of FIG. 10 can be reduced to about a half of the time required in a conventional cache memory system in which the execution of the operation sequence (C) must be delayed until the completion of the operation sequence (B).

Here, in a case the instructions to be executed by the CPU 21 are ordered as shown in FIG. 11A, the consistency in the operation of the CPU 21 cannot be maintained for "add"

instruction unless the "ld" (load) instruction and "ldi" (load) instruction are completed before this "add" instruction, so that it becomes necessary to interrupt the operation of the CPU 21 in a case a cache miss occurred for either one of the "ld" instruction and the "ldi" instruction, even in the cache memory system of this second embodiment.

In order to avoid such a possible interruption of the operation of the CPU 21, it is preferable to carry out the optimization of the instruction sequence at a compiler in advance. Namely, the instruction sequence of FIG. 11A should be optimized to the instruction sequence shown in FIG. 11B, in which the "add" instruction using "r1" and "r2" to be loaded by the "ld" instruction and the "ldi" instruction is placed at the seventh or later cycle from the "ldi" instruction by inserting the other instructions not using "r1" and "r2" (represented by "etc" in FIG. 11B) between the "ldi" instruction and "add" instruction.

It is to be noted here that if such an optimization can be made for the entire instruction sequence completely, the first cache memory unit in the cache memory system would be totally meaningless as the cache operations become altogether unnecessary, even though the presence of the first cache memory unit is not harmful to the performance of the CPU 21. However, there are cases in which such an optimization cannot be made completely, and in such cases the first cache memory unit in the cache memory system can be effective in improving the performance of the CPU 21 because the data reading can be completed in one clock cycle in a case of a cache hit in the first cache memory unit.

Also, in this second embodiment, the order in which the data supplied to the CPU 21 may not necessarily be the same as the order of the instructions for data reading depending on the occurrences of cache hit and cache miss in the first cache memory unit. However, in this embodiment, such a change of the order does not cause any problem as the appropriateness of each access is verifiedat the memory management unit 31. Namely, the memory management unit 31 is accessed at a time of or in advance to a cache memory access in order to verify the appropriateness of the cache memory access. This memory management unit 31 memorizes the virtual addresses used in the CPU 21 in correspondence to the actual addresses in the second cache memory unit, and issues an exception signal to make an interruption in the CPU 21 whenever the actual address corresponding to the address supplied from the CPU 21 does not exist or the appropriateness of the cache memory access cannot be verified, before the cache memory access is actually made.

In a case of a cache writing operation, this cache memory system operates according to the operation sequences (D) and (E) in the timing chart shown in FIG. 10, as follows.

First, the CPU 21 makes an access to the first cache memory unit by supplying an address of the desired data to be written in to the first cache tag memory unit 22, the first cache data memory unit 23, and the memory management unit 31, while also supplying the desired data to be written in to the first cache data memory unit 23. Then, whether it is a cache hit or a cache miss is determined at the first cache tag memory unit 22.

In a case of a cache hit in the first cache memory unit, the desired data supplied to the first cache data memory unit 23 is written into the first cache data memory unit 23, just as in a conventional cache memory system. In this case, the cache writing operation can be completed in one clock cycle as indicated in an operation sequence (E) of FIG. 10.

On the other hand, in a case of a case miss, the writing of the desired data into the first cache data memory unit 23 is interrupted within the same clock cycle. Here, the interruption within the same clock cycle is possible because the actual writing operation is usually carried out in the last half of the clock cycle and there is hardly any signal delay between the CPU 21 and the first cache memory unit as they are collectively provided on the single chip 83.

Then, the following second cache writing operation is carried out according to an operation sequence (D) of FIG. 10 as follows.

Namely, when the cache miss occurred at the clock cycle (4), the address of the desired data supplied from the memory management unit 31 and temporarily stored in the address latch 24 is read out from the address latch 24 to the address latch 26 while the desired data supplied from the first cache data memory unit 23 and temporarily stored in the data latch 29 is read out from the data latch 29 to the data latch 30 at the clock cycle (5). Then, an access to the second cache tag memory unit 25 is made by using the address temporarily stored in the address latch 24 while the desired data read out from the data latch 29 is transferred from the data latch 29 to the data latch 30 at the clock cycle (6). Then, the cache hit in the second cache memory unit is checked at the second cache tag memory unit 25, while the address stored in the address latch 26 and the data stored in the data latch 30 are read out at the clock cycle (7). Then, an access to the second cache data memory unit 27 is made by using the address read out from the address latch 26 at the clock cycle (8) to write in the data read out from the data latch 30 at the clock cycle (8).

The operation similar to the cache writing operation described above is also carried out in a case of writing the data into the second cache memory unit when the write through cache scheme is adopted for maintaining the consistency among the first and second cache memory units.

It is to be noted that the cache memory system of this second embodiment is also quite effective for a processing unit capable of executing a plurality of instructions simultaneously which requires a plurality of data simultaneously. Namely, in such a case, the operation speed of the CPU 21 can be improved by providing a plurality of cache memory ports to make accesses to the second cache memory unit such that a plurality of refilling operations can be carried out simultaneously. However, it is highly unlikely for the first cache memory unit to make cache misses for all the cache memory accesses simultaneously, so that the number of data requiring the refilling from the second cache memory unit is usually quite limited and therefore the sufficient performance can be maintained by providing only a very limited number of the cache memory ports for making accesses to the second cache memory unit in this second embodiment.

It is also to be noted that various memory configurations other than that shown in FIG. 9 can be used in this second embodiment. For example, the second cache memory unit may be replaced by a main memory of a processing system to which this cache memory system of the second embodiment is going to be incorporated as a part, or the refilling of the second cache memory unit from the main memory or other hierarchically superior memory unit may be incorporated. Also, the first cache memory unit may be provided outside of the chip 33.

It is also to be noted that the operation carried out in one clock cycle in the timing chart of FIG. 10 may be carried out over more than one clock cycles.

It is also to be noted that the access to the second cache data memory unit 27 may be made at the same time as the access to the second cache tag memory unit 25. In such a case, the address latch 26 and the data latches 28 and 30 are unnecessary, but it becomes necessary to interrupt the writing of the data into the second cache data memory unit 27 in a case of the cache miss in the second cache memory unit or else to make the access to the second cache memory unit in a case of the cache reading operation in a manner similarly to the access to the first cache memory unit as described above while retaining the manner of access to the second cache memory unit as described above in a case of the cache writing operation.

It is also to be noted that this second embodiment can be implemented in conjunction with the first embodiment described above by combining the features of the configuration shown in FIG. 9 with the features of the configuration shown in FIG. 6.

As described, according to this second embodiment, it becomes possible to provide a cache memory system in which there is no need to interrupt the operation of a processing unit during the execution of the refilling operation, so that a high level performance can be realized in the cache memory system of this second embodiment without causing the increase of the effective cache memory access time, even when the cache miss rate is relatively high.

Figure 12:
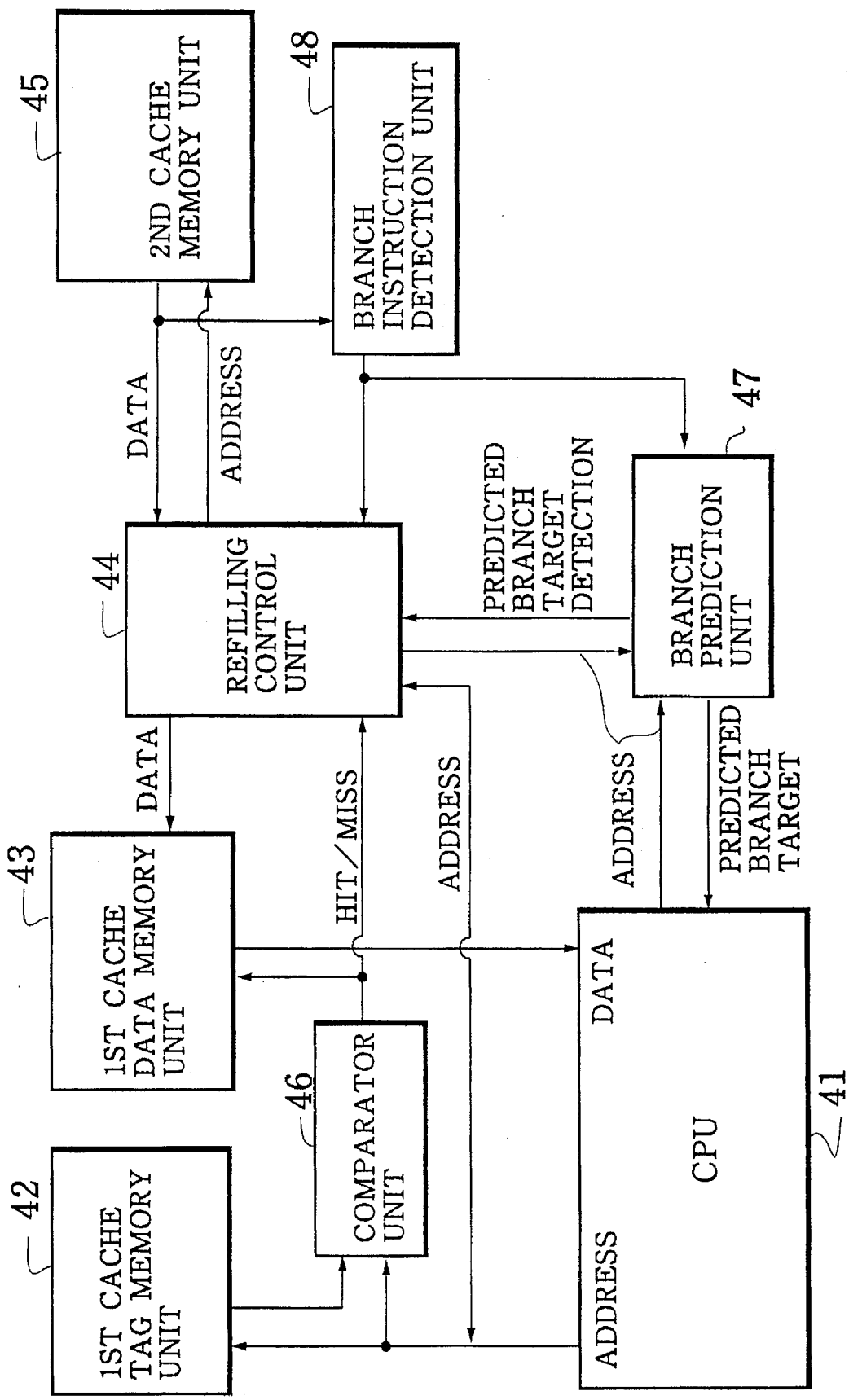
FIG. 12 is a schematic block diagram of a configuration of a third embodiment of a cache memory system according to the present invention.

Referring now to FIG. 12, a third embodiment of a cache memory system according to the present invention will be described in detail.

The cache memory system of this third embodiment is for an instruction cache, and comprises: a CPU 41; a first cache memory unit formed by a first cache tag memory unit 42 and a first cache data memory unit 43; a comparator unit 46 for determining a cache hit or a cache miss in the first cache memory unit; a refilling control unit 44 for controlling a refilling operation for the first cache memory unit; a second cache memory unit 45 to be used in the refilling operation; a branch instruction detection unit 48 for detecting a branch instruction in instructions read out from the second cache memory unit 45; and a branch prediction unit 47 for predicting the branching due to the branch instruction detected by the branch instruction detection unit 48.

In this third embodiment, as this cache memory system is for an instruction cache, the data stored in the first cache memory unit and the second cache memory unit 45 are the instructions to be executed by the CPU 41.

Here, the branch prediction unit 47 realizes the function of a so called branch target buffer which has a branch prediction table registering the address of the branch instruction in correspondence to the predicted branch target address as shown in FIG. 13A, where the predicted branch target address is based on the actual branch target address of the branch instruction encountered in the past. For example, in a case of a branch instruction for branching from the address <101> to the address <201> as shown in FIG. 13B, this branch prediction table is looked up when this branch instruction is encountered, such that the wasteful fetching of the intervening addresses <102> and <103> can be avoided by fetching the address <201> at the next cycle of the fetching of the address <101> as shown in FIG. 13C according to the predicted branch target address registered in the branch prediction table.

Now, in this cache memory system of the third embodiment, the instruction cache operation is carried out as follows.

First, the CPU 41 makes an access to the first cache memory unit by supplying an address of the desired data to be read out to the first cache tag memory unit 42 and the first cache data memory unit 43 simultaneously. Then, the comparator unit 46 determines whether it is a cache hit or a cache miss according to the address supplied from the CPU 41 and the address in the first cache tag memory unit 42.

In a case of a cache hit in the first cache memory unit, the data stored at the supplied address in the first cache data memory unit 43 is the desired data, so that it is read out to the CPU 41, just as in a conventional cache memory system. In this case, the cache reading operation can be completed in one clock cycle.

On the other hand, in a case of a case miss, the refilling operation is carried out according to the flow chart of FIG. 14 as follows.

Namely, when the cache miss is notified from the comparator unit 46 to the refilling control unit 44 at the step S111, the refilling control unit 44 makes an access to the second cache memory unit 45 by using the address of the desired data supplied from the CPU 41 to the refilling control unit 44 at the step S112.

Then, at the step S113, after the cache hit in the second cache memory unit 45 is checked, the refilling control unit 44 reads out the desired data from the second cache memory unit 45 and transmits the desired data to the first cache data memory unit 43 while rewriting the first cache tag memory unit 42 so as to refill the first cache memory unit, such that the desired data can be read out from the first cache data memory unit 48 to the CPU 41.

Next, at the step S114, the branch instruction detection unit 48 checks whether the data read out from the second cache memory unit 45 to the refilling control unit 44 at the step S213 is a branch instruction or not.

In a case the data is not the branch instruction, next at the step S119, an address for making an access to the second cache memory unit 45 is added with an increment +1 in the refilling control unit 44, and the refilling control unit 44 makes another access to the second cache memory unit 45 by using the increment added address so as to read out the next data at the next address of the desired data in the second cache memory unit 45 at the step S120. Then, whether this next data is already stored in the first cache memory unit or not is determined at the step S121, and when this next data is not yet stored in the first cache memory unit the process returns to the step S113 so as to continue the refilling operation for the subsequent data in a manner similar to that described above for the original desired data, whereas when this next data is already stored in the first cache memory unit the refilling operation is terminated at the step S122.

In this manner, once a cache miss occurs in the first cache memory unit, the refilling operation is automatically continued until the branch instruction is encountered, so that the cache miss in the first cache memory unit can be avoided at least until the next branch instruction. Here, although not indicated in FIG. 14, the refilling operation may be terminated whenever the branch instruction is encounted.

On the other hand, in a case the branch instruction detection unit 48 detects that the data is the branch instruction at the step S114, next at the step S115, the address of this data which is the branch instruction is transmitted from the refilling control unit 44 to the branch prediction unit 47, and then whether the branch target address of this branch instruction is registered in the branch prediction unit 47 or not is determined at the step S116.

In a case the branch target address of this branch instruction is registered in the branch prediction unit 47, next at the step S117, the registered branch target address of this branch instruction is transmitted from the branch prediction unit 47 to the refilling control unit 44, and the refilling control unit makes another access to the second cache memory unit 45 by using the registered branch target address so as to read out the next data at the registered branch target address of this branch instruction in the second cache memory unit 45 at the step S118, and then the process proceeds to the step S121 to continue the refilling operation from the registered branch target address.

In a case the branch target address of this branch instruction is not registered in the branch prediction unit 47, the process proceeds from the step S116 to the step S119 by assuming that this branch instruction which is not registered in the branch prediction unit 47 is false one which is not going to actually branch when it is actually executed.

Here, it is to be noted that this manner of continuing the refilling operation one address by one address according to the content of each data at each address is much less wasteful than the collective refilling of a block containing a predetermined number of data at once because such a collective refilling cannot avoid the wasteful refilling of the unnecessary data subsequent to the branch instruction.

It is also to be noted that, in order to reduce the required capacity of the first cache tag memory unit 42, the stored contents of the first cache tag memory unit 42 and the first cache data memory unit 43 can be organized as shown in FIG. 15, where each entry in the first cache tag memory unit 42 contains a plurality (four in FIG. 15) of valid bits V0, V1, V2, V3 for indicating the validity of four data in the first cache data memory unit 43 which are cllectively associated with one address in the first cache tag memory unit 42. Each entry of the first cache tag memory unit 42 also contains another valid bit M for indicating a presence of at least one data among the four data associated with the address of this entry which has been rewritten by the CPU 41, so as to indicate the need for the write back of these four data to the second cache memory unit 45.

It is also to be noted that various memory configurations other than that shown in FIG. 12 can be used in this third embodiment described above. For example, the second cache memory unit may be replaced by a main memory of a processing system to which this cache memory system of the third embodiment is going to be incorporated as a part, or the refilling of the second cache memory unit from the main memory or other hierarchically superior memory unit may be incorporated.

It is also to be noted that the third embodiment described above can be modified to realize more than one refilling operation sequences simultaneously by replacing each signal line in the configuration of FIG. 12 by more than one parallel signal lines.

It is also to be noted that the third embodiment described above can be modified to further incorporate a counter for counting a number of consecutive executed refilling operations such that the consecutively continued refilling operations are terminated whenever the number counted by the counter exceeds a predetermined maximum number of times for which the refilling operation can be carried out consecutively.

It is also to be noted that the third embodiment described above can be modified to terminate the refilling operation when a predetermined number of the data read out from the second cache memory unit are already stored in the first cache memory unit consecutively.

It is also to be noted that the third embodiment described above can be modified such that the ongoing refilling operation is terminated whenever a new cache miss occurs in the first cache memory unit such that the new refilling operation for the newly occurred cache miss can supersede the older refilling operation for the previously occurred cache miss.

It is also to be noted that the third embodiment described above can be modified such that, in a case the branch target address of the newly encountered branch instruction is not registered in the branch prediction unit 47, the process proceeds from the step S116 to the step S122 to terminate the refilling operation, instead of proceeding to the step S119 as described above, so that the refilling operation is resumed only when the address to be accessed after this branch instruction is not stored in the first cache memory unit, regardless of whether this branch instruction is a true one or a false one.

It is also to be noted that this third embodiment can be implemented in conjunction with the first embodiment described above by combining the features of the configuration shown in FIG. 12 with the features of the configuration shown in FIG. 6.

Figure 16:
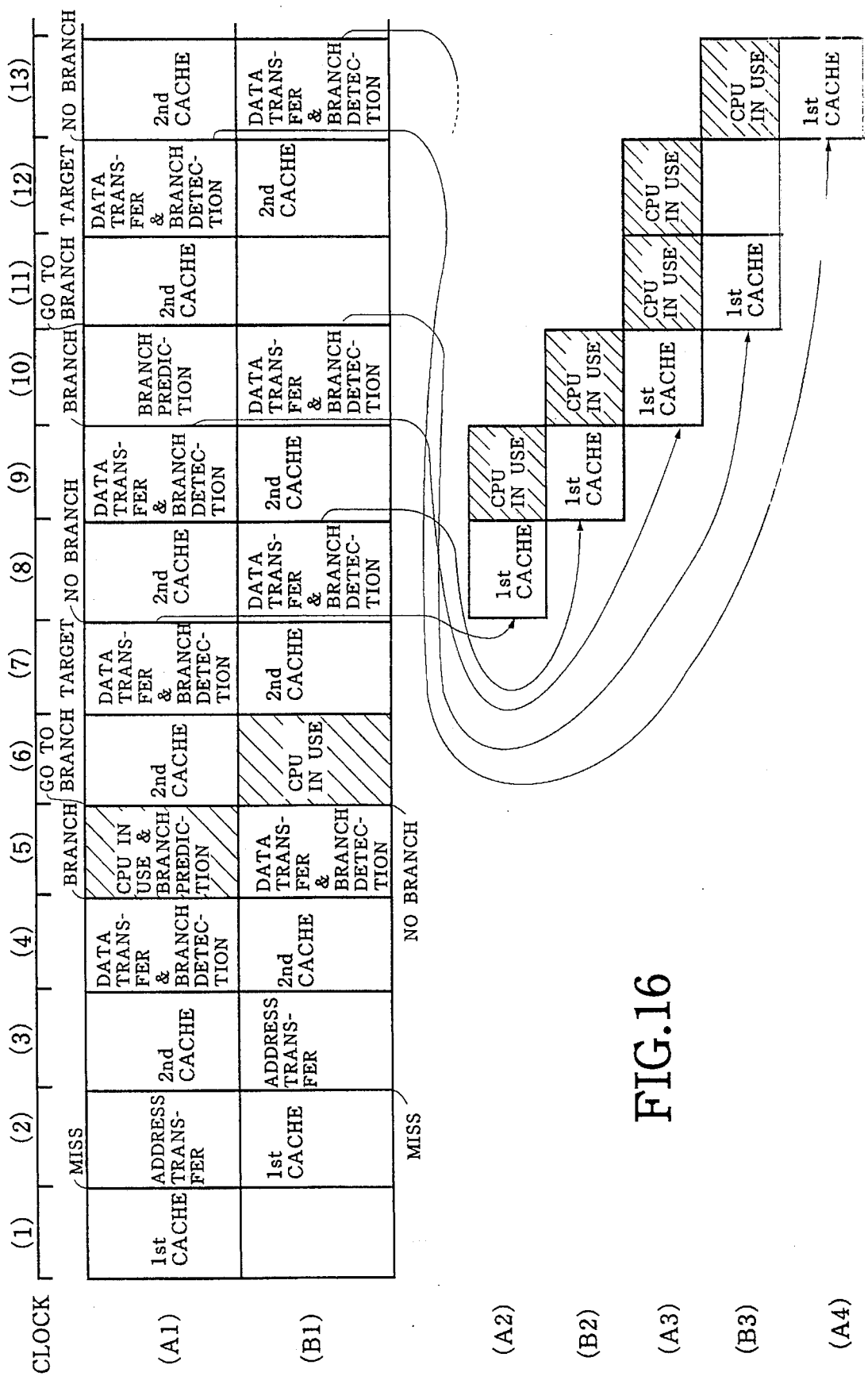
FIG. 16 is a timing chart for cache read and refilling operations in the third embodiment of a cache memory system shown in FIG. 12 incorporating a feature of the second embodiment of a cache memory system shown in FIG. 9.

It is also to be noted that this third embodiment can be implemented in conjunction with the second embodiment described above by combining the features of the configuration shown in FIG. 12 with the features of the configuration shown in FIG. 9. In such a case, the cache reading operation can proceeds according to the timing chart shown in FIG. 16. In this timing chart of FIG. 16, the refilling operations are carried out in parallel in the operation sequences (A1) and (B1), and even though each refilling operation takes more clock cycles than each CPU operation in this case, the operation of the CPU using the first cache memory unit can be resumed at the clock cycle (8) by means of the two parallely proceeding refilling operations in the operation sequences (A1) and (B1), and the operation of the CPU can be continued thereafter without an interruption as the operation sequences (A2), (B2), (A3), (B3), (A4), etc., by using the data supplied into the first cache memory unit by the parallely ongoing refilling operations in the operation sequences (A1) and (B1). In a case each refilling operation takes less clock cycles than each CPU operation, the single refilling operation by the operation sequence (A1) for example alone would be sufficient to keep up with the progress of the CPU operation, since the refilling operation necessary for the start of the operation sequence (A3) can be completed in the operation sequence (A1) during the CPU operation in the operation sequence (A2) and so on.

As described, according to this third embodiment it becomes possible to provide a cache memory system capable of continuing the operation of a processing unit during the execution of the refilling operation, even in a case of an instruction cache, such that a huge scale task can be effectively handled even with a limited cache memory size.

Figure 17:
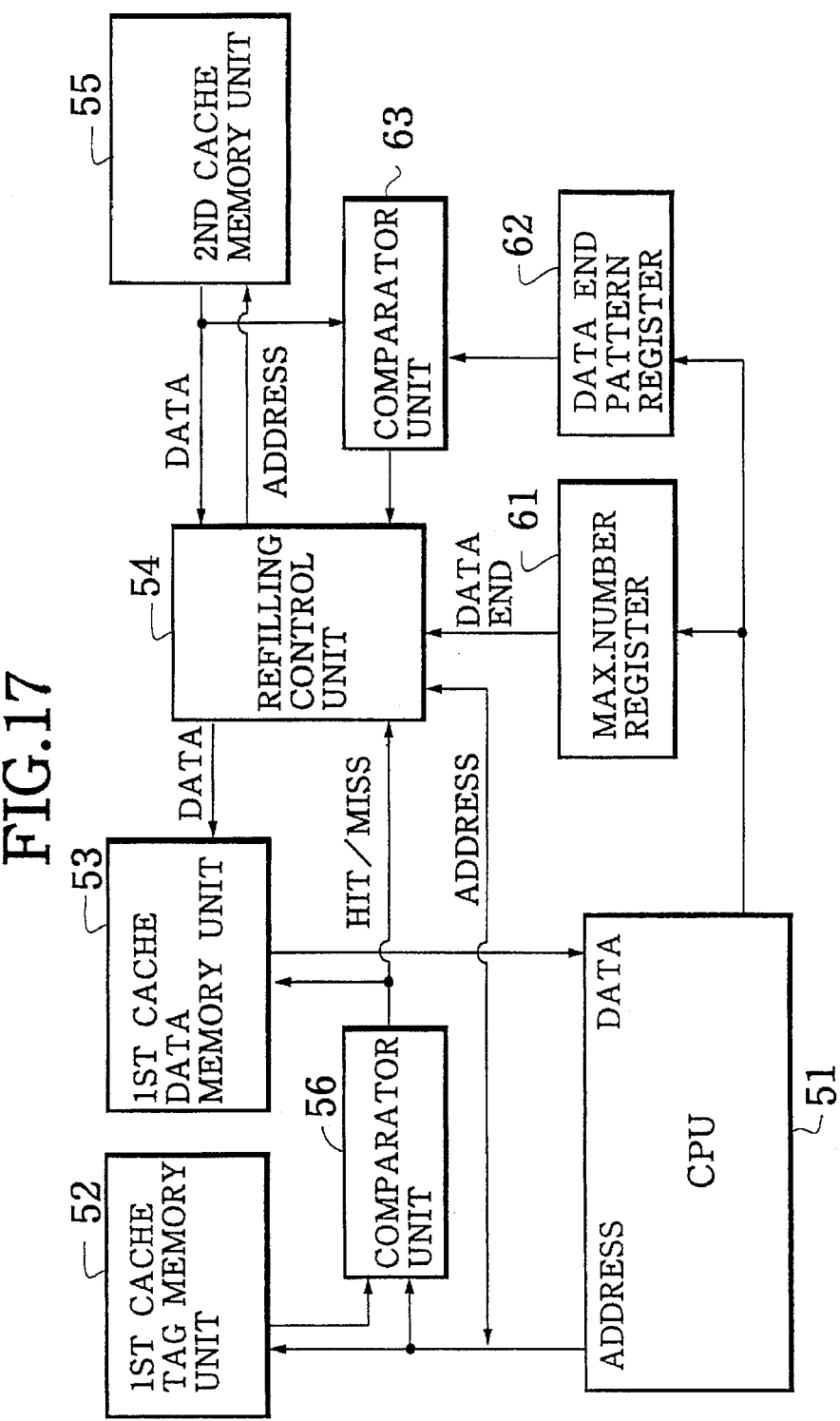
FIG. 17 is a schematic block diagram of a configuration of a fourth embodiment of a cache memory system according to the present invention.

Referring now to FIG. 17, a fourth embodiment of a cache memory system according to the present invention will be described in detail. This fourth embodiment can be regarded as an adaptation of the third embodiment described above for a case of a data cache.

In this fourth embodiment, the cache memory system comprises: a CPU 51; a first cache memory unit formed by a first cache tag memory unit 52 and a first cache data memory unit 58; a comparator unit 56 for determining a cache hit or a cache miss in the first cache memory unit; a refilling control unit 54 for controlling a refilling operation for the first cache memory unit; a second cache memory unit 55 to be used in the refilling operation; a maximum consecutive refilling operation number register 81 for indicating a maximum number of times for which the refilling operation by the refilling control unit 54 can be carried out consecutively; a data end pattern register 62 for indicating a predetermined data end pattern; and a comparator unit 68 for determining the data end during the consecutive refilling operation by comparing the data read out from the second cache memory unit 55 and the data end pattern indicated by the data end pattern register 62 in order to determine the timing for terminating the consecutive refilling operation.

Figure 18:
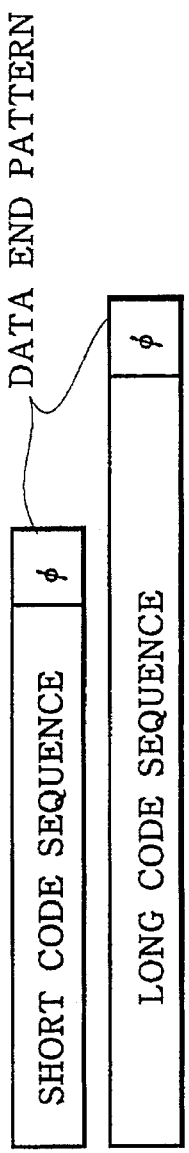
FIG. 18 is a schematic diagram representing types of data to be handled in the fourth embodiment of a cache memory system shown in FIG. 17.

In this fourth embodiment, as this cache memory system is for a data cache, the data stored in the first cache memory unit and the second cache memory unit 55 are the data to be used by the CPU 41. Here, the data to be handled in this cache memory system are of variable length including a short code sequence and a long code sequence as shown in FIG. 18, both of which have the data end pattern "φ" attached at an end.

Now, in this cache memory system of the fourth embodiment, the instruction cache operation is carried out as follows.

First, the CPU 51 makes an access to the first cache memory unit by supplying an address of the desired data to be read out to the first cache tag memory unit 52 and the first cache data memory unit 53 simultaneously. Then, the comparator unit 56 determines whether it is a cache hit or a cache miss according to the address supplied from the CPU 51 and the address in the first cache tag memory unit 52.

In a case of a cache hit in the first cache memory unit, the data stored at the supplied address in the first cache data memory unit 58 is the desired data, so that it is read out to the CPU 51, just as in a conventional cache memory system. In this case, the cache reading operation can be completed in one clock cycle.

Figure 19:
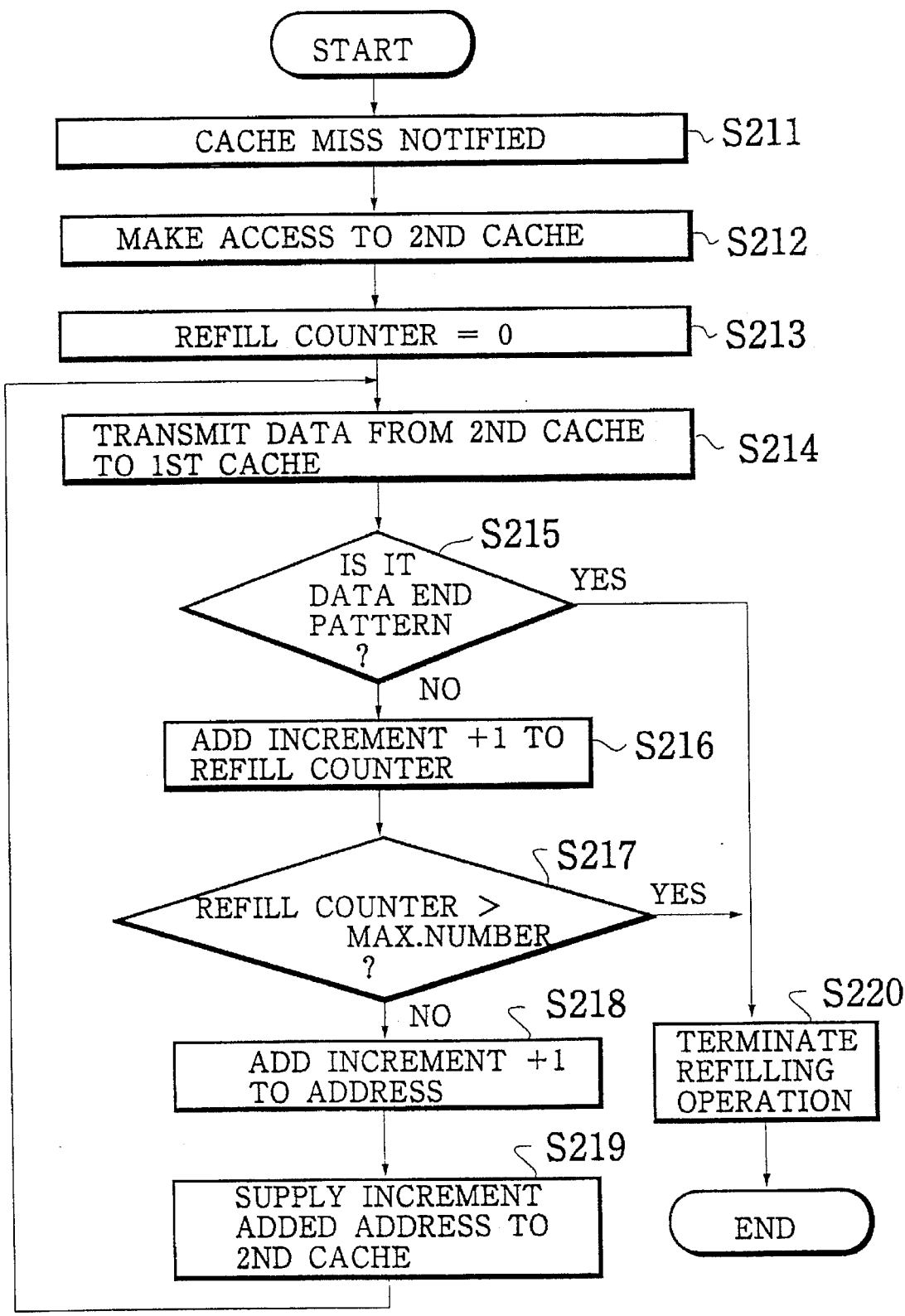
FIG. 19 is a flow chart for a refilling operation by a refilling control unit in the fourth embodiment of a cache memory system shown in FIG. 17.

On the other hand, in a case of a case miss, the refilling operation is carried out according to the flow chart of FIG. 19 as follows.

Namely, when the cache miss is notified from the comparator unit 56 to the refilling control unit 54 at the step S211, the refilling control unit 54 makes an access to the second cache memory unit 55 by using the address of the desired data supplied from the CPU 51 to the refilling control unit 54 at the step S212.

Then, at the step S213, a refilling operation counter in the refilling control unit 54 is initially set to zero.

Then, at the step S214, after the cache hit in the second cache memory unit 55 is checked, the refilling control unit 54 reads out the desired data from the second cache memory unit 55 and transmits the desired data to the first cache data memory unit 53 while rewriting the first cache tag memory unit 52 so as to refill the first cache memory unit, such that the desired data can be read out from the first cache data memory unit 53 to the CPU 51.

Next, at the step S215, the comparator unit 63 checks whether the data read out from the second cache memory unit 55 at the step S214 is the data end or not by comparing the data read out from the second cache memory unit 55 and the data end pattern indicated by the data end pattern register 62.

In a case the data is not the data end, next at the step S216, the refilling operation counter in the refilling control unit 54 is added with an increment +1, and whether this increment added value of the refilling operation counter is greater than the maximum number indicated by the maximum consecutive refilling operation number register 61 or not is determined at the step S217. In a case the increment added value of the refilling operation counter is not greater than the maximum number, next at the step S218, an address for making an access to the second cache memory unit 55 is added with an increment +1 in the refilling control unit 54, and the refilling control unit 54 makes another access to the second cache memory unit 55 by using the increment added address so as to read out the next data at the next address of the desired data in the second cache memory unit 55 at the step S219, and then the process returns to the step S214 so as to continue the refilling operation for the subsequent data in a manner similar to that described above for the original desired data.

In a case the comparator unit 63 determines that the data read out from the second cache memory unit 55 is the data end at the step S215, or in a case the increment added value of the refilling operation counter is greater than the maximum number at the step S217, the refilling operation is terminated at the step S220.

In this manner, once a cache miss occurs in the first cache memory unit, the refilling operation is automatically continued until the data end is encountered or the refilling operation is carried out consecutively for the predetermined maximum number of times, so that the cache miss in the first cache memory unit can be avoided at least until the data end or for the length corresponding to the predetermined maximum number. Here, the maximum number registered in the maximum consecutive refilling operation number register 61 is set by considering the possibility of a presence of a bug in the data.

It is also to be noted that various memory configurations other than that shown in FIG. 17 can be used in this fourth embodiment described above. For example, the second cache memory unit may be replaced by a main memory of a processing system to which this cache memory system of the fourth embodiment is going to be incorporated as a part, or the refilling of the second cache memory unit from the main memory or other hierarchically superior memory unit may be incorporated.

It is also to be noted that the fourth embodiment described above can be modified to realize more than one refilling operation sequences simultaneously by replacing each signal line in the configuration of FIG. 17 by more than one parallel signal lines.

It is also to be noted that this fourth embodiment can be implemented in conjunction with the first embodiment described above by combining the features of the configuration shown in FIG. 17 with the features of the configuration shown in FIG. 6.

It is also to be noted that this fourth embodiment can be implemented in conjunction with the second embodiment described above by combining the features of the configuration shown in FIG. 17 with the features of the configuration shown in FIG. 9.

It is also to be noted that this fourth embodiment can be implemented in conjunction with the third embodiment described above by combining the features of the configuration shown in FIG. 17 with the features of the configuration shown in FIG. 12.

As described, according to this fourth embodiment, the effects similar to those of the third embodiment described above can also be achieved for a case of the data cache.

It is further to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. A cache memory system, comprising:

a plurality of processing units including a primary processing unit for carrying out a calculation of memory access addresses; and a plurality of cache memory units provided in correspondence to said plurality of processing units, each one of said plurality of cache memory units including a cache tag memory unit for determining a cache hit/miss in said each one of said plurality of cache memory units and a cache data memory unit for storing data for a respective one of said plurality of processing units, where the cache data memory unit of each one of said plurality of cache memory units is arranged in closer positional relation to the respective one of said plurality of processing units compared; with processing units other than the respective one of said plurality of processing units while all of the cache tag memory units of said plurality of cache memory units are collectively arranged in closer positional relation to the primary processing unit compared with processing units other than the primary processing unit;

wherein when the cache data memory unit of one of said plurality of cache memory units stores a data required by another one of said plurality of cache memory units, the required data is transferred from the cache data memory unit of said one of said plurality of cache memory units to the cache data memory unit of said another one of said plurality of cache memory units.

2. The cache memory system of claim 1, wherein said plurality of processing units are arranged separately on separate chips, and the cache data memory unit of each one of said plurality of cache memory units is arranged along the respective one of said plurality of processing units on an identical one of the separate chips on which the respective one of said plurality of processing units is arranged, while all of the cache tag memory units of said plurality of cache memory units are collectively arranged along the primary processing unit on a primary one of the separate chips on which the primary processing unit is arranged.

3. The cache memory system of claim 2, wherein the cache hit/miss in each one of the cache memory units is determined within said primary one of the separate chips.

4. The cache memory system of claim 2, wherein a memory access address for making an access to the cache data memory unit of each one of said plurality of cache memory units is transferred from said primary one of the separate chips to a respective one of said separate chips in abbreviated format.

5. The cache memory system of claim 1, further comprising a secondary memory unit for refilling the cache memory data units of said plurality of cache memory units in a case of a cache miss in one of said plurality of cache memory units.

6. The cache memory system of claim 5, further comprising a secondary memory access means for making an access to the secondary memory unit in case of a cache miss in one of said plurality of cache memory units, which is also arranged in a closer positional relation to the primary processing unit compared with processing units other than the primary processing unit.

7. The cache memory system of claim 1, wherein when one of said plurality of cache memory units stores a data to be overwritten in another one of said plurality of cache memory units, the data to be overwritten is invalidated in said one of said plurality of cache memory units before the data is overwritten in said another one of said plurality of cache memory units.

8. The cache memory system of claim 1, wherein the primary processing unit supplies a memory access address for making an access to one of said plurality of cache memory units to all of the cache tag memory units of said plurality of cache memory units, so as to determine a cache hit/miss for said memory access address in each one of said plurality of cache memory units.

* * * * *